United States Patent
Niimi

(10) Patent No.: US 7,419,751 B2
(45) Date of Patent: Sep. 2, 2008

(54) TITANYLPHTHALOCYANINE CRYSTAL AND METHOD OF PRODUCING THE TITANYLPHTHALOCYANINE CRYSTAL, AND ELECTROPHOTOGRAPHIC PHOTORECEPTOR, METHOD, APPARATUS AND PROCESS CARTRIDGE USING THE TITANYLPHTHALOCYANINE CRYSTAL

(75) Inventor: Tatsuya Niimi, Shizuoka-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/454,556

(22) Filed: Jun. 5, 2003

(65) Prior Publication Data

US 2004/0033428 A1 Feb. 19, 2004

(30) Foreign Application Priority Data

Jun. 13, 2002 (JP) ............................. 2002-172496

(51) Int. Cl.
*G03G 5/06* (2006.01)
*G03G 5/047* (2006.01)

(52) U.S. Cl. ..................... 430/59.5; 435/59.6; 435/66; 435/123.4; 435/78; 435/135; 540/140; 399/111; 399/159

(58) Field of Classification Search .............. 430/78, 430/66, 67, 59.6, 58.7, 59.5, 123.4; 399/111, 399/159; 540/140
See application file for complete search history.

(56) References Cited

U.S. PATENT DOCUMENTS

| 4,898,799 | A | * | 2/1990 | Fujimaki et al. | ............... | 430/78 |
| 5,368,967 | A | * | 11/1994 | Schank et al. | ................. | 430/66 |
| 5,576,131 | A | * | 11/1996 | Takai et al. | .................... | 430/78 |
| 5,871,876 | A | | 2/1999 | Ikuno et al. | | |
| 6,087,055 | A | | 7/2000 | Niimi | | |
| 6,132,911 | A | | 10/2000 | Niimi | | |
| 6,218,533 | B1 | | 4/2001 | Niimi | | |
| 6,232,466 | B1 | * | 5/2001 | Daimon et al. | .............. | 540/141 |
| 6,516,169 | B2 | | 2/2003 | Niimi et al. | | |
| 6,562,531 | B2 | | 5/2003 | Niimi | | |
| 7,186,490 | B1 | * | 3/2007 | Niimi et al. | .................... | 430/78 |

FOREIGN PATENT DOCUMENTS

| JP | 61-239248 | | 10/1986 |
| JP | 64-017066 | | 1/1989 |
| JP | 01-299874 | | 12/1989 |
| JP | 02-008256 | | 1/1990 |
| JP | 03-109406 | | 5/1991 |
| JP | 03-269064 | | 11/1991 |
| JP | 4-198367 | * | 7/1992 |
| JP | 04-337362 | | 11/1992 |
| JP | 05-094049 | | 4/1993 |
| JP | 05-113688 | | 5/1993 |
| JP | 05-188614 | | 7/1993 |
| JP | 07-289870 | | 11/1995 |
| JP | 08-044086 | | 2/1996 |
| JP | 08-123045 | | 5/1996 |
| JP | 08-272111 | | 10/1996 |
| JP | 09-211873 | | 8/1997 |
| JP | 11-005919 | | 1/1999 |
| JP | 11-030871 | | 2/1999 |
| JP | 2000-126638 | | 5/2000 |
| JP | 2000-181104 | | 6/2000 |
| JP | 2000-206723 | | 7/2000 |
| JP | 2000-239556 | | 9/2000 |
| JP | 2000-281931 | | 10/2000 |
| JP | 2000-319538 | | 11/2000 |
| JP | 2001-019871 | | 1/2001 |
| JP | 2001-022108 | | 1/2001 |
| JP | 2001-034001 | | 2/2001 |
| JP | 2001-117249 | | 4/2001 |
| JP | 2001-211448 | | 8/2001 |
| JP | 2001-226432 | | 8/2001 |
| JP | 2001-265027 | | 9/2001 |
| JP | 2001-019871 | | 10/2001 |
| JP | 2001-290292 | | 10/2001 |
| JP | 2002-148904 | | 5/2002 |
| JP | 2002-148905 | | 5/2002 |

OTHER PUBLICATIONS

Diamond, Arthur S & David Weiss (eds.) Handbook of Imaging Materials. New York: Marcel-Dekker, Inc. (Nov. 2001) pp. 146-168, 379-381.*
Grant, Roger et al. Grant & Hackh's Chemical Dictionary. New York: McGraw-Hill, Inc. (1987) p. 542.*
U.S. Appl. No. 10/275,413, filed Jul. 26, 2002, Niimi.
U.S. Appl. No. 10/856,962, filed Jun. 1, 2004, Ikegami, et al.
U.S. Appl. No. 10/927,050, filed Aug. 27, 2004, Niimi et al.
U.S. Appl. No. 10/606,750, filed Jun. 27, 2003, Toda, et al.
U.S. Appl. No. 10/784,872, filed Feb. 24, 2004, Shimada, et al.
U.S. Appl. No. 10/804,067, filed Mar. 19, 2004, Toda, et al.
U.S. Appl. No. 10/944,614, filed Sep. 20, 2004, Niimi, et al.
U.S. Appl. No. 10/656,280, filed Sep. 8, 2003, Niimi et al.
U.S. Appl. No. 10/944,003, filed Sep. 20, 2004, Yanagawa et al.
U.S. Appl. No. 11/219,886, filed Sep. 7, 2005, Niimi, et al.

(Continued)

*Primary Examiner*—Christopher RoDee
(74) *Attorney, Agent, or Firm*—Oblon, Spivak, McClelland, Maier & Neustadt, P.C.

(57) ABSTRACT

A titanylphthalocyanine crystal having an X-ray diffraction spectrum having plural diffraction peaks and a primary particle diameter not greater than 0.2 μm, wherein a maximum diffraction peak is observed at a Bragg (2θ) angle of 27.2±0.2°; main peaks are observed at 9.4°, 9.6° and 24.0°; and a minimum diffraction peak is observed at 7.3°; and preferably no diffraction peak is observed at an angle greater than 7.3° and less than 9.4° when a specific X-ray of CuKα having a wavelength of 1.542 Å irradiates the titanylphthalocyanine crystal.

18 Claims, 12 Drawing Sheets

OTHER PUBLICATIONS

Katsumi Daimon, et al., "A New Polymorph of Hydroxygallium Phthalocyanine and Its Application in a Photoreceptor," Journal of Imagaing Science and Technology, vol. 40, No. 3, May/Jun. 1996, pp. 249-253.

Yoshihide Fujimaki, et al., "High Photosensitivity of an Organic Photoreceptor," IS&T's Seventh International Congress on Advances in Non-Impact Printing Technologies, vol. 1, Oct. 6-11, 1991, pp. 269-275.

U.S. Appl. No. 11/304,711, filed Dec. 16, 2005, Kondo, et al.
U.S. Appl. No. 11/332,545, filed Jan. 17, 2006, Tamoto, et al.
U.S. Appl. No. 11/367,786, filed Mar. 6, 2006, Ohta, et al.
U.S. Appl. No. 11/364,325, filed Mar. 1, 2006, Niimi.
U.S. Appl. No. 11/611,179, filed Dec. 15, 2006, Niimi, et al.
U.S. Appl. No. 11/625,873, filed Jan. 23, 2007, Niimi.

* cited by examiner

TITANYLPHTHALOCYANINE CRYSTAL AND METHOD OF PRODUCING THE TITANYLPHTHALOCYANINE CRYSTAL, AND ELECTROPHOTOGRAPHIC PHOTORECEPTOR, METHOD, APPARATUS AND PROCESS CARTRIDGE USING THE TITANYLPHTHALOCYANINE CRYSTAL

BACKGROUND OF THE INVENTION

1. Field of the Invention

The present invention relates to a titanylphthalocyanine crystal and a method of producing the titanylphthalocyanine crystal, and to an electrophotographic photoreceptor, method, apparatus and process cartridge using the titanylphthalocyanine crystal.

2. Discussion of the Background

An organic pigment has been used as a filler for a coating material since comparatively a long ago. In particular, the organic pigment has the advantage over an inorganic pigment in its abundance of color variation. Further, recently as an application of the organic pigment, a variety of materials have been produced because it was spotlighted as a material for an organic photoelectric transfer device.

Almost all methods of forming a film including the organic pigment are wet coating methods. It is not exaggerated to say quality of a film coated by the wet coating methods depends on quality of a dispersion liquid including the pigment. Dispersibility of the pigment in the dispersion liquid is one of essentials for the quality of the dispersion liquid. Therefore, a good dispersion liquid includes the pigment sufficiently dispersed in a vehicle and continues the dispersed status for a long term.

Recently, digital electrophotographic methods prevail, and particularly a negative and positive development (reverse development) is mostly used. In a case of the negative and positive development, a part of a photoreceptor used in the electrophotographic method is irradiated by imagewise light and a potential of the part decreases to form a toner image thereon. This is performed in consideration of a longevity of a light source and fatigue of the photoreceptor because writing ratio of an original copy is more or less 10% at most. However, background of a produced copy corresponds to a non-irradiated part (high potential part) of the photoreceptor, and when a photosensitive layer (particularly a charge generation layer) has a coating defect, a background portion (white background portion) of the photoreceptor which should have maintained potential decreases potential, resulting in occasional occurrence of point defects such as background fouling and black spots. These defects are occasionally mistaken for points in drawings and periods and commas in English drafts, and it can be said that the defects are fatal defects as images. Such point defects are often caused by a layer constituted of dispersed film including pigments, etc. Therefore, in order to decrease the point defects, a dispersion liquid having good dispersibility of pigments, etc. has to be produced. A particle size of the pigment in the dispersion liquid is preferably as small as possible, and a pigment having a primary particle size not greater than about 0.2 μm considerably decrease the point defects as mentioned above.

In order to produce such dispersion liquids, a variety of dispersers and dispersion systems and methods of increasing dispersibility have been suggested. For example, any of Japanese Laid-Open Patent Publications Nos. 4-373362, 5-188614, 7-289870, 8-44086, 8-123945, 8-272111, 9-211873, 11-30871, 11-258827, 2000-126638, 2000-181104, 2000-281931, 2001-265027 and 2001-290292 discloses a technology to miniaturize (reduce a particle size of) synthesized large average-size pigment particles in a dispersion liquid as small as possible using a variety of dispersers, dispersing conditions or improving the dispersers and conditions. It can be said that these dispersion methods are good technologies in terms of efficiently dispersing the pigment until the pigment has the primary particle size. However, it is quite difficult to reduce the particle size more than the primary particle size, and a limit of the particle size in the dispersion liquid basically depends on the primary particle size of the pigment. Methods of pulverizing the primary particle with an enormous energy are included in the methods, but these break the crystal and have problems such as deterioration of dispersion efficiency and transform of the crystal form as mentioned later.

On the other hand, as a useful charge generation material, titanylphthalocyanine is known. The titanylphthalocyanine is a polytypic crystal pigment including many crystal forms as an aggregate even when having the same formula. Particularly, a titanylphthalocyanine crystal having at least a maximum diffraction peak at of a Bragg (2θ) angle of 27.2±0.2° when irradiated with a specific X-ray of CuKα having a wavelength 1.542 Å has significantly a high photocarrier generation efficiency as a charge generation material for an electrophotographic photoreceptor among polytypic crystal pigments. However, the titanylphthalocyanine has a quasi-crystallinity and easily transforms to other crystal forms. When an excessive energy is applied to the crystal, the crystal easily transforms to a titanylphthalocyanine crystal having a maximum diffraction peak at Bragg (2θ) angle of 26.3°. Because this crystal has considerably a lower photocarrier generation efficiency than the above-mentioned crystal, when even a partly transformed crystal is used for a charge generation material for a photoreceptor, problems such as deterioration of photosensitivity and increase of residual potential in repeated use occur.

When the dispersion condition is tempered to prevent this crystal transform, the resultant dispersion liquid includes a pigment having a large particle diameter or remaining coarse pigment particles. When such a dispersion liquid including a pigment having a large average particle diameter is used, surface area of the total charge generation materials becomes small, and it becomes difficult for the material to give and receive a charge to and from charge transport material, resulting in problems such as deterioration of photosensitivity and increase of residual potential in repeated use of the resultant photoreceptor occur. When the coarse particles remain, the resultant image has problems such as background fouling and black spots occur in the negative and positive development.

As just described, in the dispersion of the titanylphthalocyanine pigment particles, stability of the crystal form and miniatulization of the particles have a trade-off relation and means to easily solve this problem have not been available.

As another method of reducing the particle size of the pigment in the dispersion liquid, a method of using a pigment which can easily be dispersed, i.e., which has significantly a small primary particle diameter can be considered. In this method, a pigment previously having a small primary particle diameter is synthesized to obtain a dispersion liquid including a pigment having a small particle diameter without applying an excessive energy to the pigment. This method not only improves dispersion efficiency but also can be considered as significantly an effective method when using a pigment in which a crystal easily transforms such as the above-mentioned titanylphthalocyanine.

However, approaches in terms of pigment synthesis have hardly been seen so far. Only Japanese Laid-Open Patent Publication No. 2000-239556 discloses a method of producing a dispersion liquid using means of combining a crystal conversion and dispersion means. This method can form a dispersion liquid including a pigment having a primary particle diameter, which is formed by the crystal conversion. However, considering the dispersion liquid is used for a coating liquid, a crystal conversion solvent is not limited to a suitable coating solvent and the method has a drawback of having a restriction in coating. In addition, because the dispersion liquid cannot be stored as a pigment powder, the method also has a drawback of having a restriction in storage.

Because of these reasons, a need exists for a titanylphthalocyanine crystal having a small primary particle size and a method of producing the titanylphthalocyanine crystal to prepare a dispersion liquid including a pigment having a small average particle size without a crystal transform of the titanylphthalocyanine crystal which is quite useful as a charge generation material for an electrophotographic photoreceptor.

SUMMARY OF THE INVENTION

Accordingly, an object of the present invention is to provide a titanylphthalocyanine crystal having quite a small primary particle diameter and is capable of preparing a dispersion liquid including the titanylphthalocyanine crystal, in which the crystal stability is high and the particle size is small.

Another object of the present invention is to provide a method of producing the titanylphthalocyanine crystal.

Yet another object of the present invention is to provide a stable electrophotographic photoreceptor using the titanylphthalocyanine crystal and producing less abnormal images without loss of high sensitivity, deterioration of chargeability and increase of residual potential in repeated use.

Further, another object of the present invention is to provide a stable electrophotographic method, an electrophotographic apparatus and a process cartridge therefor using the electrophotographic photoreceptor, which are capable of printing at a high-speed and producing less abnormal images.

Briefly these objects and other objects of the present invention as hereinafter will become more readily apparent can be attained by a titanylphthalocyanine crystal having an X-ray diffraction spectrum having plural diffraction peaks and a primary particle diameter not greater than 0.2 μm, wherein a maximum diffraction peak is observed at a Bragg (2θ) angle of 27.2±0.2°; main peaks are observed at 9.4°, 9.6° and 24.0°; and a minimum diffraction peak is observed at 7.3°; and preferably no diffraction peak is observed at an angle greater than 7.3° and less than 9.4° when a specific X-ray of CuKα having a wavelength of 1.542 Å irradiates the titanylphthalocyanine crystal.

In addition, titanylphthalocyanine crystal preferably has no diffraction peak at 26.3° when irradiated with the specific X-ray of CuKα having a wavelength of 1.542 Å.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1:
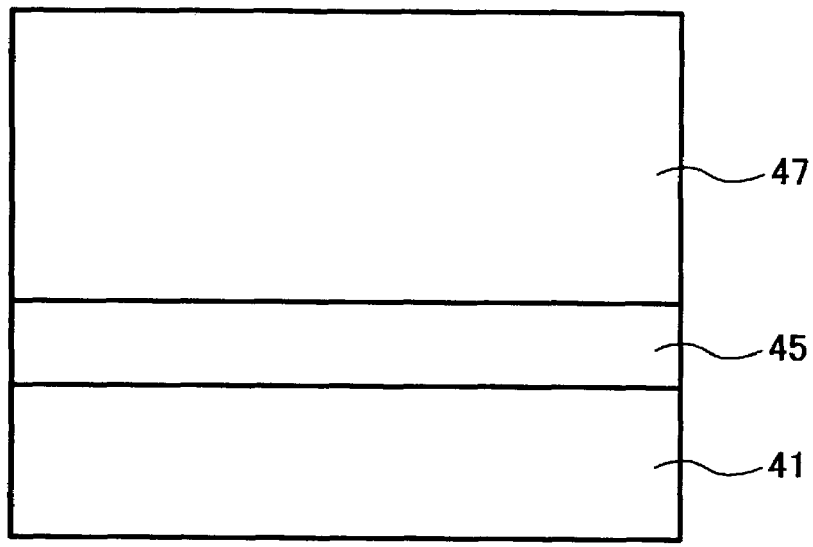
FIG. 1 is a schematic view illustrating a cross section of an embodiment of the photosensitive layer of the electrophotographic photoreceptor for use in the present invention.

Generally, the present invention provides a titanylphthalocyanine crystal having quite a small primary particle diameter and a method of producing the titanylphthalocyanine crystal.

Various properties of an electrophotographic photoreceptor using an organic pigment as a charge generation material (hereinafter referred to as a CGM) depend on a particle size of the CGM in a photosensitive layer of the photoreceptor. For example, when a particle size of a CGM is large, deactivation probability of a photocarrier generated by the CGM becomes high inside the particle before transferred to a charge transport material. In addition, when a particle size of a CGM is large, surface area of the total CGMs inevitably becomes small. Therefore, a contact amount of the CGM and a charge transport material becomes small and a photocarrier injection efficiency to the charge transport material lowers. Further, when a particle size of a CGM is large, probability of coating defect of a photosensitive layer (charge generation layer) becomes high and the resultant images tend to be defective.

Because of these reasons, it is desired that a particle size of a CGM in a photosensitive layer (charge generation layer) becomes as small as possible. Because a photosensitive layer (charge generation layer) is usually formed by a wet coating method, a CGM particle size in a coating dispersion liquid forming the layer has to be small so as to reduce the particle size of the CGM in the photosensitive layer.

A variety of dispersion methods are suggested to reduce the particle size of the CGM in the dispersion liquid for coating the photosensitive layer. However, a serious problem of any of the methods is how secondary particles which are agglomeration of the CGM are pulverized and dispersed to primary particles. These methods are designed to make the particles close to the primary particles as much as possible with an enormous dispersion energy or an extension of dispersion time, etc. However, the primary particle size is determined in synthesizing the CGM and it is difficult to make the particle size smaller than the primary particle size by an ordinary method.

On the other hand, a dispersion method capable of applying much larger dispersion energy to the particles than a ball mill method having been used from a long time ago, is suggested. In addition, a method of further pulverizing the primary particles is also developed recently. These methods pulverize a crystal itself to reduce the particle size of the CGM. This method can be said to be suitable for a CGM having a highly stable crystal stability.

However, when organic CGMs are used, only specific crystal forms often make specific performance even if they have the same formula. Such a specific crystal form occasionally changes with ease due to a simple physical or mechanical stress as well other than a chemical stress. When such an excessive dispersion energy as pulverizes the primary particles as mentioned above is applied to such a material, the crystal form changes before the particles are pulverized. Consequently, it frequently happens that a material which exerts a specific performance changes into a material which does not sufficiently exert the specific performance.

A phthalocyanine crystal for use in the present invention, particularly a titanylphthalocyanine pigment crystal is a crystal polytypic material. Only a crystal having at least a maximum diffraction peak at a Bragg (2θ) angle of 27.2±0.2° when irradiated with a specific X-ray of CuKα having a wavelength of 1.542 Å especially has a photocarrier generation efficiency. Other crystal materials perform as CGMs, but do not have properties which are satisfactory to high-speed printing, smaller diameters of photoreceptors and high stability in repeated use required by the present electrophotographic process. Therefore, the above-mentioned crystal form can be said to be a specific crystal form.

However, the titanylphthalocyanine crystal having a maximum diffraction peak at 27.2° has a quasi-crystallinity and is a material having a low crystal stability. Therefore, when a mechanical or physical stress as mentioned above is applied to the crystal, the crystal transforms to another crystal form having a stable crystal form.

Although the titanylphthalocyanine crystal has such a high performance as a CGM, miniatulization of the particles and stability of the crystal form have a trade-off relation and means to easily solve this problem have not been available.

The present inventors analyzed a process of pulverizing and dispersing the titanylphthalocyanine crystal in order to solve the above problem to obtain the following findings.

Namely, in the process of dispersing the titanylphthalocyanine crystal, when the crystal is dispersed so as to have a desired particle size, an excessive dispersion energy has to be applied to the crystal because the primary particles having a particle size larger than the desired size are present. In addition, there is a remarkable difference between an energy required to disperse the secondary particles which are agglomeration of the primary particles and an energy to further pulverize an enormous primary particles. The former energy is not applied to the crystal but to the dispersion until the crystal transforms. The latter energy is applied to both the pulverization and crystal until the crystal transforms.

The present inventors found that a dispersion liquid including a titanylphthalocyanine crystal having a small particle size and a high crystal stability can be prepared without giving an excessive dispersion energy to the liquid by miniaturizing primary particles of the titanylphthalocyanine crystal as much as possible.

An average particle size of the primary particles of the titanylphthalocyanine crystal in the present invention is determined by the following method.

A liquid including a titanylphthalocyanine crystal subjected to a crystal conversion is observed by a transmission electron microscope (TEM); the TEM image is photographed as a TEM photograph; and 30 titanylphthalocyanine crystals are selected at random to measure a longer diameter of each crystal. An arithmetic average of the longer diameters of the 30 titanylphthalocyanine crystals is determined as the average particle size.

Next, the present inventors tried to synthesize the titanylphthalocyanine crystal to obtain the following findings.

Namely, the titanylphthalocyanine crystal having at least a maximum diffraction peak at 27.2° is typically synthesized with titanylphthalocyanine having a lower crystal stability than the titanylphthalocyanine crystal having at least a maximum diffraction peak at 27.2°. A method often used is to convert crude titanylphthalocyanine synthesized in accordance with the law into amorphous or low crytallinity titanylphthalocyanine considered to have lowest crystal stability by a method called an acid paste treatment using a sulfuric acid, etc. A crystal conversion is performed on the amorphous or low crytallinity titanylphthalocyanine by various methods to obtain a titanylphthalocyanine crystal having a desired crystal form. A method most often used for the crystal conversion is a method of transforming a crystal with a proper organic solvent in the presence of water.

The present inventors paid attention to morphology of the titanylphthalocyanine crystal particles before and after the crystal conversion. The above-mentioned amorphous or low crytallinity titanylphthalocyanine subjected to the acid paste treatment is precipitated in water having a low solubility from a titanylphthalocyanine acid liquid solution and has a small primary particle size. The amorphous or low crytallinity titanylphthalocyanine is usually formed of microscopic particles having a diameter about 0.1 μm or less and a shape which is close to a needle although depending on the conditions of the acid paste treatment. The titanylphthalocyanine crystal subjected to the crystal conversion has a crystal transform and a crystal growth at the same time, and usually the crystal is separated and filtered after the crystal conversion is surely performed. Therefore, the titanylphthalocyanine crystal subjected to the crystal conversion has considerably a large primary particles having a particle diameter of from about 0.3 to 0.4 μm, and even about 1 μm. As mentioned above, it is found that the primary particle size of the titanylphthalocyanine crystal for use in the present invention is determined by the crystal conversion process.

A specific titanylphthalocyanine crystal preferably used in the present invention having at least a maximum diffraction peak at a Bragg (2θ) angle of 27.2±0.2°; main peaks at 9.4, 9.6 and 24.0±0.2°; a minimum diffraction peak at 7.3±0.2°; and preferably not having peaks greater than 7.3° and less than 9.4°, and at 26.3° when irradiated with a specific X-ray CuKα having a wavelength of 1.542 Å is disclosed in Japanese Laid-Open Patent Publication No. 2001-19871. However, when a titanylphthalocyanine crystal is produced in the condition disclosed therein, the resultant titanylphthalocyanine crystal has a large primary particles and problems as mentioned above.

A method of dissolving a trade-off relationship between miniatulization of particles and crystal stability in dispersing the titanylphthalocyanine crystal is how small the primary particles thereof is synthesized.

As a result of a study in consideration of the above, it is found that a time of crystal conversion is set as short as possible, i.e., about less than 1 hour, and preferably less than 30 min although depending on the crystal conversion conditions when a crystal conversion is performed using the above-mentioned microscopic amorphous titanylphthalocyanine or low crytallinity titanylphthalocyanine particles as a material with an organic solvent in the presence of water, and that a desired crystal having microscopic primary particles can be separated and filtered from the organic solvent before the crystal grows, i.e., before the primary particle size grows to be not less than 0.2 μm.

Hereinafter, specific methods will be explained.

First, a method of synthesizing a crude titanylphthalocyanine crystal will be explained.

Methods of synthesizing phthalocyanines have been known for a long time, and are disclosed in "Phthalocyanine compounds" published in 1963 and "The Phthalocyanines" published in 1983, which are written by Moser and other authors, and in Japanese Laid-Open Patent Publication No. 6-293769.

For example, A first method is to heat a mixture of phthalic anhydrides, metals or halogenated metals and urea in the presence or no presence of a solvent having a high boiling point. In this method, catalysts such as ammonium molybdate are optionally used together. A second method is to heat phthalonitriles and halogenated metals in the presence or no presence of a solvent having a high boiling point. This method is used to produce phthalocyanine which cannot be produced by the first method, such as aluminium phthalocyanine, indium phthalocyanine, oxovanadium phthalocyanine, oxotitanium phthalocyanine and zirconium phthalocyanine. A third method is to react phthalic anhydrides or phthalonitrile with ammonia first to prepare an intermediate such as 1,3-diiminoisoindoline and to react the intermediate with halogenated metals in a solvent having a high boiling point. A fourth method is to react phthalonitrile with metalalkoxide in the presence of urea, etc. Particularly, the fourth method is significantly an effective method to synthesize a material for electrophotographies because chlorination (halogenation) of a benzene ring does not occur.

Next, a method of synthesizing an amorphous titanylphthalocyanine (low crystallinity titanylphthalocyanine) will be explained. This is a method of dissolving phthalocyanine in a sulfuric acid, diluting the mixture with water and re-precipitating. An acid paste method or an acid slurry method can be used.

A specific method is to dissolve the above-mentioned synthesized crude titanylphthalocyanine crystal in a concentrated sulfuric acid 10 to 50 times as much as the crude titanylphthalocyanine crystal, optionally remove insolubles with a filer, etc. and slowly put the mixture into sufficiently cooled or iced water 10 to 50 time as much as the concentrated sulfuric acid to re-precipitate the titanylphthalocyanine. After the precipitated titanylphthalocyanine is filtered, the titanylphthalocyanine is washed with ion exchange water and filtered. This operation is sufficiently repeated until the filtrate becomes neutral. Finally, after the titanylphthalocyanine is washed with clear ion exchange water and is filtered to prepare a water paste having a solid concentration of from 5 to 15 by weight. Thus, the amorphous titanylphthalocyanine (low crystallinity titanylphthalocyanine) for use in the present invention is prepared. The amorphous titanylphthalocyanine (low crystallinity titanylphthalocyanine) preferably has at least a maximum diffraction peak at a Bragg ($2\theta$) of from 7.0 to 7.5±0.2° when irradiated with a specific X-ray of CuKα having a wavelength of 1.542 Å. Particularly, half width of the diffraction peak is preferably not less than 1°. Further, it is essential for the following crystal conversion that the primary particles have an average particle size not greater than 0.1 μm.

Next, the crystal conversion method will be explained.

The crystal conversion is a process of converting the above-mentioned amorphous titanylphthalocyanine (low crystallinity titanylphthalocyanine) to a desired crystal form, i.e., a crystal form having at least a maximum diffraction peak at a Bragg ($2\theta$) angle of 27.2±0.2° of when irradiated with a specific X-ray of CuKα having a wavelength of 1.542 Å. Particularly, the titanylphthalocyanine crystal having main peaks at 9.4°, 9.6° and 24.0°, a minimum diffraction peak at 7.3° and preferably not having peaks at greater than 7.3° and less than 9.4° is preferably used. Further, the titanylphthalocyanine crystal not having a peak at 26.3° is more preferably used.

A specific method of obtaining such titanylphthalocyanine crystal is to mix and stir the amorphous titanylphthalocyanine (low crystallinity titanylphthalocyanine) with an organic solvent in the presence of water without drying the amorphous titanylphthalocyanine (low crystallinity titanylphthalocyanine). In this process, to control such that a longer diameter of the primary particles of the titanylphthalocyanine crystal after the crystal conversion is not greater than 0.2 μm is a point of the present invention.

Any organic solvent for use in this method can be used if only a desired crystal form can be obtained. In particular, a solvent selected from the group consisting of tetrahydrofuran, toluene, dichloromethane, carbon bisulfide, o-dichlorobenzene and 1,1,2-trichloroethane is preferably used. These solvents are preferably used alone, but can also be used in combination or with other solvents.

The present inventors observed in the crystal conversion that the amorphous titanylphthalocyanine (low crystallinity titanylphthalocyanine) has a primary particle diameter not greater than 0.1 μm (almost all the particles have a diameter of from about 0.01 to 0.05 μm), and that the crystal grows at the same time. Usually, in such a crystal conversion, a sufficient time is spent for the crystal conversion such that the materials do not remain and a filtered titanylphthalocyanine crystal having a desired crystal form is obtained after the sufficient crystal conversion. Therefore, the crystal after the crystal-conversion has large primary particles (about 0.3 to 0.5 μm in diameter) although the material having sufficiently small primary particles is used.

When the thus prepared titanylphthalocyanine crystal is dispersed, a strong shear is applied to make the particle size small (not greater than about 0.2 μm in diameter). Further, a strong energy is optionally applied to pulverize the primary particles. Consequently, a part of the particles has an undesired crystal form as mentioned above.

On the other hand, the present invention is to obtain a titanylphthalocyanine crystal having a primary particle size as small as possible by finding out the time when the crystal conversion is completed before the crystal hardly grows, i.e., before the amorphous titanylphthalocyanine particle size becomes greater than about 0.2 μm. The particle size becomes large in proportion to the crystal conversion time. Therefore, it is essential to enhance the crystal conversion efficiency and complete the conversion in a short time. For this purpose, there are two important points.

One is to select a suitable crystal conversion solvent as mentioned above to enhance the crystal conversion efficiency. The other is to strongly stir the solvent and titanylphthalocyanine water paste as prepared as above such that they sufficiently contact to each other in order to complete the crystal conversion in a short time. Specifically, stirring methods using strong stirrers such as propeller stirrers and homogenizers (homomixers) are used to perform the crystal conversion in a short time. These methods can obtain a titanylphthalocyanine crystal sufficiently converted without crystal growth and remaining materials.

In addition, as mentioned above, because the crystal particle size grows in proportion to the crystal conversion time, when a predetermined reaction (crystal conversion) is completed, it is an effective method to stop the reaction immediately. For example, after the crystal conversion is performed, a large amount of a solvent preventing a crystal conversion is immediately included in the mixture. Suitable solvents preventing a crystal conversion include alcohol solvents, ester solvents, etc. These solvents having an amount of approximately ten times as much as the crystal conversion solvent can stop the crystal conversion.

The smaller the thus prepared primary particle size, the better for the resultant photoreceptor. However, in consideration of the following filtering process to prepare a pigment and dispersion stability thereof in a dispersion liquid, primary particles having too small a size occasionally has an adverse effect. Namely, when the primary particle size is too small, it takes quite a long time to filter the particles in the filtering process. In addition, because the primary particles having too small a size totally have a large surface area, probability of re-agglomeration of the pigment particles increases. Therefore, the pigment particles preferably have a particle size of from about 0.05 to 0.2 μm.

Next, the converted titanylphthalocyanine crystal is immediately filtered to be separated from the crystal conversion solvent. A filter having a proper size is used for the filtration. The filtration under reduced pressure is most preferably used.

Then, the separated titanylphthalocyanine crystal is optionally heated and dried. A known drier can be used for heating and drying the crystal. However, a fan drier is preferably used when heating and drying the crystal are performed in the atmosphere. Further, in order to increase drying speed and an effect of the present invention, drying under reduced pressure is quite an effective method. Particularly, drying under reduced pressure is an effective method for a material which is dissolved by a high temperature or a material the crystal form of which changes. In particular, drying in a degree of vacuum which is higher than 10 mmHg is effective.

The organic pigment having a high capability of generating a photocarrier for use in the present invention typically has quite a high agglutinability. When the crystal is dried as mentioned above after filtered and separated, the primary particles agglutinate to form secondary particles. These secondary particles can be dispersed to the primary particles with an ordinary disperser. However, the crystal dare not be dried if the crystal conversion solvent and the dispersion solvent are the same. In that case, a wet cake of the titanylphthalocyanine crystal after filtered is directly put into the dispersion solvent in which a binder resin is optionally dissolved to disperse the titanylphthalocyanine crystal. This method does not have to disperse the large secondary particles and more distinguishes the effect of the present invention.

The thus prepared titanylphthalocyanine crystal having a primary particle diameter not greater than 0.2 μm is effectively used for a CGM for an electrophotographic photoreceptor. Particularly, the titanylphthalocyanine crystal having a maximum diffraction peak at a Bragg (2θ) angle of 27.2±0.2° when irradiated with a specific X-ray of CuKα having a wavelength of 1.542 Å has quite a high photocarrier generation efficiency. However, as mentioned above, the crystal form is unstable and has a drawback of easily transforming. However, in the present invention, the primary particles which are as small as possible can prepare a dispersion liquid including the particles having a small average particle diameter and can make the crystal form quite stable.

The dispersion liquid is prepared by typical methods using a ball mill, an attritor, a sand mill, a beads mill, an ultrasonic, etc., in which the titanylphthalocyanine crystal is optionally dispersed with a binder resin in a proper solvent. The binder resin may be selected for electrostatic properties of the resultant photoreceptor, and the solvent may be selected for wettability to the pigment and dispersibility thereof.

Hereinafter, the electrophotographic photoreceptor of the present invention will be explained, referring to the drawings.

FIG. 1 is a schematic view illustrating a cross section of an embodiment of the photosensitive layer of the electrophotographic photoreceptor for use in the present invention, in which a charge generation layer (hereinafter referred to as a CGL) 45 including a CGM as a main component and a charge transport layer (hereinafter referred to as a CTL) 47 including a charge transport material (hereinafter referred to as a CTM) as a main component are formed on an electroconductive substrate 41.

Figure 2:
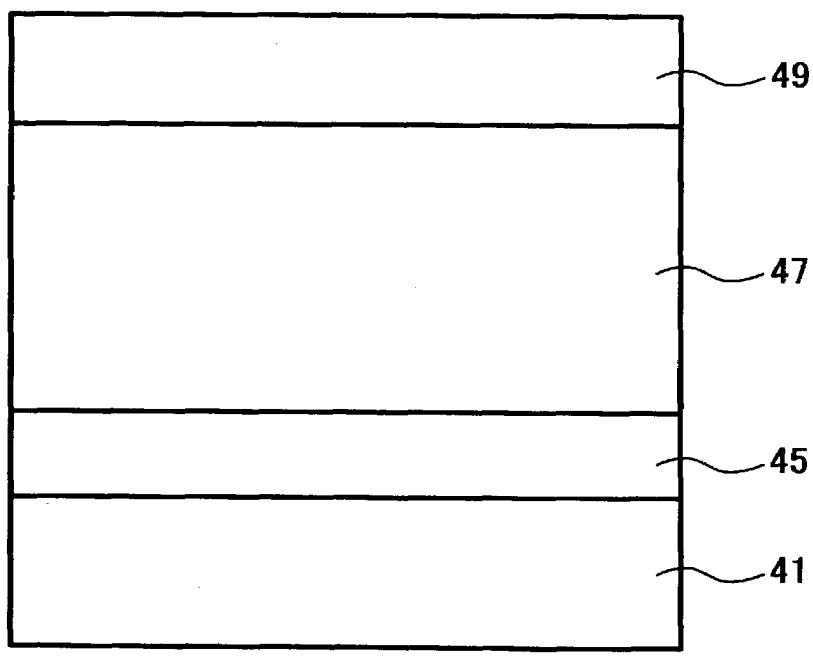
FIG. 2 is a schematic view illustrating a cross section of another embodiment of the photosensitive layer of the electrophotographic photoreceptor for use in the present invention.

FIG. 2 is a schematic view illustrating a cross section of another embodiment of the photosensitive layer of the electrophotographic photoreceptor for use in the present invention, in which a protection layer 49 is layered on a CGL 45 and CTL 47.

Suitable materials for the electroconductive substrate 41 include materials having a volume resistance not greater than $10^{10}$ Ω·cm. Specific examples of such materials include plastic cylinders, plastic films or paper sheets whose surface is deposited or sputtered with a metal such as aluminum, nickel, chromium, nichrome, copper, gold, silver, platinum and the like, or a metal oxide such as tin oxides, indium oxides and the like. In addition, a plate of a metal such as aluminum, aluminum alloys, nickel and stainless steel and a metal cylinder, which is prepared by tubing a metal such as the metals mentioned above by a method such as impact ironing or direct ironing, and then treating the surface of the tube by cutting, super finishing, polishing and the like treatments, can also be used as the substrate. Further, endless belts of a metal such as nickel and stainless steel, which are disclosed in Japanese Laid-Open Patent Publication No. 52-36016, can also be used as the substrate 41.

Among these materials, a cylindrical substrate formed of aluminium which is easily coated by an anodic oxide coating method can most preferably be used. The aluminium includes either of pure aluminium and aluminium base alloys.

Specifically, aluminium or aluminium base alloys in the thousands, three thousands and six thousands of JIS are most suitable. The anodic oxide coating method is a method of coating various metals and alloyed metals in an electrolyte. A film called as alumite formed by the anodic oxide coating method coating the aluminium or aluminium base alloys in an electrolyte is most suitable for the photoreceptor for use in the present invention. Particularly, when the photoreceptor is used for a reverse development (negative and positive development), the photoreceptor has good capability of preventing point defects such as black spots and background fouling.

The anodic oxide coating is performed in an acidic solution using a chromic acid, a sulfuric acid, an oxalic acid, a phosphoric acid, a boric acid, sulfamic acid, etc. Among these acids, a sulfuric acid solution is most preferably used. For example, the anodic oxide coating is usually performed in the conditions of a sulfuric acid concentration of from 10 to 20%; a liquid temperature of from 5 to 25° C.; a current density of from 1 to 4 A/dm²; a bath voltage of from 5 to 40 V; and a performance time is 5 to 60 min. However, the conditions are not limited thereto. Because the thus prepared anodic oxide coated film is porous and highly insulative, the film has a quite an unstable surface. Therefore, as time passes, properties of the anodic oxide coated film easily change. In order to avoid this, it is preferable that the anodic oxide coated film is further sealed. The sealing methods include dipping the anodic oxide coated film in an aqueous solution including nickel fluoride or nickel acetate, or a boiled water and steam sealing. Among these methods, the method of dipping the anodic oxide coated film in an aqueous solution including nickel acetate is most preferably used. Following the sealing, the anodic oxide coated film is washed to mainly remove unnecessary materials such as metallic salts adhered to the film by the sealing. The excessive materials remaining on a surface of the substrate (the anodic oxide coated film) not only have a bad influence upon quality of a coated film formed thereon but also cause background fouling because low resistance materials typically remain. One time washing with purified water may be sufficient, but usually the anodic oxide coated film is washed several times. The final cleaning liquid is preferably as clean as possible (deionized). In addition, one of the times is preferably a physical abrasion washing with a contact member. The thus prepared anodic oxide coated film preferably has a thickness of from about 5 to 15 µm. When the thickness is less than 5 µm, the anodic oxide coated film does not have a sufficient barrier effect. When greater than 15 µm, a time constant as an electrode is so large that the resultant photoreceptor occasionally has a residual potential or a deteriorated response.

Beisdes, substrates on which a coating liquid including a binder resin and an electroconductive powder is coated can also be used as the substrate 41. Specific examples of such an electroconductive powder include carbon black, acetylene black, powders of metals such as aluminum, nickel, iron, Nichrome, copper, zinc, silver and the like, and metal oxides such as electroconductive tin oxides, ITO and the like. Specific examples of the binder resin include known thermoplastic resins, thermosetting resins and photo-crosslinking resins, such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates, cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins and the like resins. Such an electroconductive layer can be formed by coating a coating liquid in which an electroconductive powder and a binder resin are dispersed in a solvent such as tetrahydrofuran, dichloromethane, methyl ethyl ketone, toluene and the like solvent, and then drying the coated liquid.

Further, substrates, in which an electroconductive resin film is formed on a surface of a cylindrical substrate using a heat-shrinkable resin tube which is made of a combination of a resin such as polyvinyl chloride, polypropylene, polyesters, polyvinylidene chloride, polyethylene, chlorinated rubber and fluorine-containing resins, with an electroconductive material, can also be used as the substrate 41.

Next, a photosensitive layer will be explained.

The CGL 45 is a layer including a titanylphthalocyanine crystal having an average primary particle diameter not greater than 0.2 µm, which is a main component thereof as a CGM. The titanylphthalocyanine crystal preferably has at least a maximum diffraction peak at a Bragg (2θ) angle of 27.2±0.2° when irradiated with a specific X-ray of CuKα having a wavelength of 1.542 Å. Further, the titanylphthalocyanine crystal having main peaks at 9.4°, 9.6° and 24.0°; a minimum diffraction peak at 7.3°; and preferably not having peaks at greater than 7.3° and less than 9.4°_is more preferably used. Furthermore, the titanylphthalocyanine crystal not having a peak at 26.3° is most preferably used.

The CGL 45 can be formed by dispersing the above-mentioned pigment in a proper solvent optionally together with a binder resin using a ball mill, an attritor, a sand mill or a supersonic dispersing machine, coating the coating liquid on an electroconductive substrate and then drying the coated liquid.

Suitable binder resins optionally used in the CGL 45 include polyamides, polyurethanes, epoxy resins, polyketones, polycarbonates, silicone resins, acrylic resins, polyvinyl butyral, polyvinyl formal, polyvinyl ketones, polystyrene, polysulfone, poly-N-vinylcarbazole, polyacrylamide, polyvinyl benzal, polyesters, phenoxy resins, vinyl chloride-vinyl acetate copolymers, polyvinyl acetate, polyphenylene oxide, polyamides, polyvinyl pyridine, cellulose resins, casein, polyvinyl alcohol, polyvinyl pyrrolidone, and the like resins. The content of the binder resin in the CGL 45 is preferably from 0 to 500 parts by weight, and preferably from 10 to 300 parts by weight per 100 parts by weight of the CGM.

Suitable solvents for use in the coating liquid include isopropanol, acetone, methyl ethyl ketone, cyclohexanone, tetrahydrofuran, dioxane, ethyl cellosolve, ethyl acetate, methyl acetate, dichloromethane, dichloroethane, monochlorobenzene, cyclohexane, toluene, xylene, ligroin, and the like solvents. In particular, ketone type solvents, ester type solvents and ether type solvents are preferably used. The coating liquid can be coated by a coating method such as a dip coating method, a spray coating method, a bead coating method, a nozzle coating method, a spinner coating method and a ring coating method. The thickness of the charge generation layer (35) is preferably from 0.01 to 5 µm, and more preferably from 0.1 to 2 µm.

The CTL 47 can be formed by dissolving or dispersing a CTM and a binder resin in a proper solvent, coating the dissolved or dispersed liquid on the charge generation layer and drying the coated liquid. Additives such as plasticizers, leveling agents and antioxidants may be included in the CTL if desired.

The CTMs are classified into positive-hole transport materials and electron transport materials. Specific examples of the electron transport materials include electron accepting materials such as chloranil, bromanil, tetracyanoethylene, tetracyanoquinodimethane, 2,4,7-trinitro-9-fluorenon, 2,4,5, 7-tetranitro-9-fluorenon, 2,4,5,7-tetanitroxanthone, 2,4,8-trinitrothioxanthone, 2,6,8-trinitro-4H-indeno[1,2-b] thiophene-4-one, 1,3,7-trinitrodibenzothiphene-5,5-dioxide, benzoquinone derivatives and the like.

Specific examples of the positive-hole transport materials include known materials such as poly-N-carbazole and its derivatives, poly-γ-carbazolylethylglutamate and its derivatives, pyrene-formaldehyde condensation products and their derivatives, polyvinyl pyrene, polyvinyl phenanthrene, polysilane, oxazole derivatives, oxadiazole derivatives, imidazole derivatives, monoarylamines, diarylamines, triarylamines, stilbene derivatives, α-phenyl stilbene derivatives, benzidine derivatives, diarylmethane derivatives, triarylmethane derivatives, 9-styrylanthracene derivatives, pyrazoline derivatives, divinyl benzene derivatives, hydrazone derivatives, indene derivatives, butadiene derivatives, pyrene derivatives, bisstilbene derivatives, enamine derivatives, etc. These CTMs can be used alone or in combination.

Specific examples of the binder resin include thermoplastic resins or thermosetting resins such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates, cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins and alkyd resins.

The content of the CTM is preferably from 20 to 300 parts by weight, and more preferably from 40 to 150 parts by weight per 100 parts by weight of the binder resin. The CTL preferably has a thickness of from about 5 to 100 µm. Suitable solvents for use in the coating liquid include tetrahydrofuran, dioxane, toluene, dichloromethane, monochlorobenzene, dichloroethane, cyclohexanone, methyl ethyl ketone, acetone and the like solvents.

The CTL 47 preferably includes a polymer CTM, which has both a binder resin function and a charge transport function, because the resultant CTL has good abrasion resistance. Suitable charge transport polymer materials include known polymer CTMs. Among these materials, polycarbonate resins having a triarylamine structure in their main chain and/or side chain are preferably used. In particular, polymer CTMs having the following formulae (I) to (X) are preferably used:

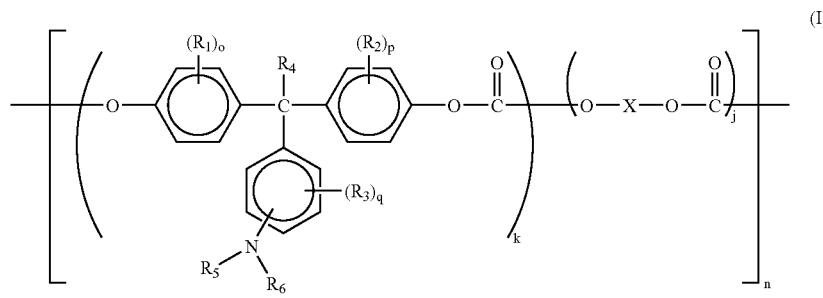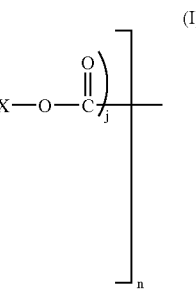

(I)

wherein, $R_1$, $R_2$ and $R_3$ independently represent a substituted or unsubstituted alkyl group, or a halogen atom; $R_4$ represents a hydrogen atom, or a substituted or unsubstituted alkyl group; $R_5$, and $R_6$ independently represent a substituted or unsubstituted aryl group; o, p and q independently represent 0 or an integer of from 1 to 4; k is a number of from 0.1 to 1.0 and j is a number of from 0 to 0.9; n represents a repeating number and is an integer of from 5 to 5000; and X represents a divalent aliphatic group, a divalent alicyclic group or a divalent group having the following formula:

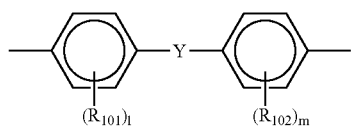

wherein, $R_{101}$ and $R_{102}$ independently represent a substituted or unsubstituted alkyl group, an aromatic ring group or a halogen atom; l and m represent 0 or an integer of from 1 to 4; and Y represents a direct bonding, a linear alkylene group, a branched alkylene group, a cyclic alkylene group, —O—, —S—, —SO—, —SO2-, —CO—, —CO—O-Z-O—CO— (Z represents a divalent aliphatic group), or a group having the following formula:

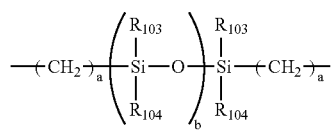

wherein, a is an integer of from 1 to 20; b is an integer of from 1 to 2000; and $R_{103}$ and $R_{104}$ independently represent a substituted or unsubstituted alkyl group, or a substituted or unsubstituted aryl group, and wherein $R_{101}$, $R_{102}$, $R_{103}$ and $R_{104}$ may be the same or different from the others;

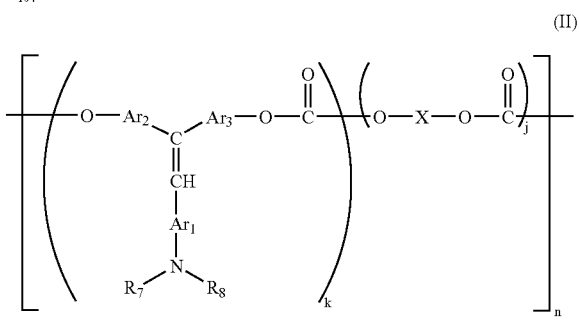

(II)

wherein, $R_7$ and $R_8$ represent a substituted or unsubstituted aryl group; $Ar_1$, $Ar_2$ and $Ar_3$ independently represent an arylene group; and X, k, j and n are same in formula (I);

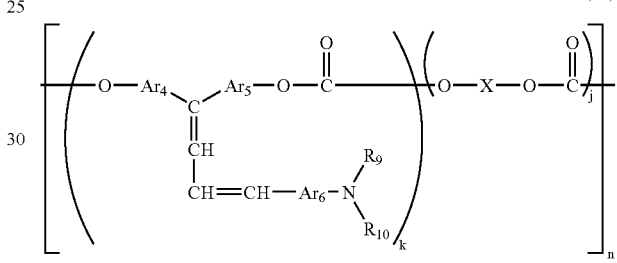

(III)

wherein, $R_9$ and $R_{10}$ represent a substituted or unsubstituted aryl group; $Ar_4$, $Ar_5$ and $Ar_6$ independently represent an arylene group; and X, k, j and n are same in formula (I);

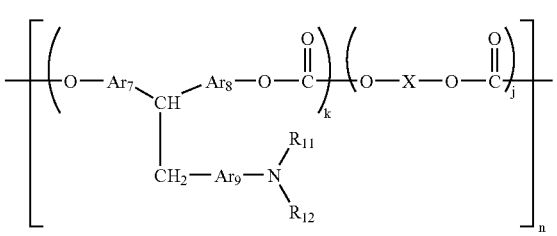

(IV)

wherein, $R_{11}$ and $R_{12}$ represent a substituted or unsubstituted aryl group; $Ar_7$, $Ar_8$ and $Ar_9$ independently represent an arylene group; p is an integer of from 1 to 5; and X, k, j and n are same in formula (I);

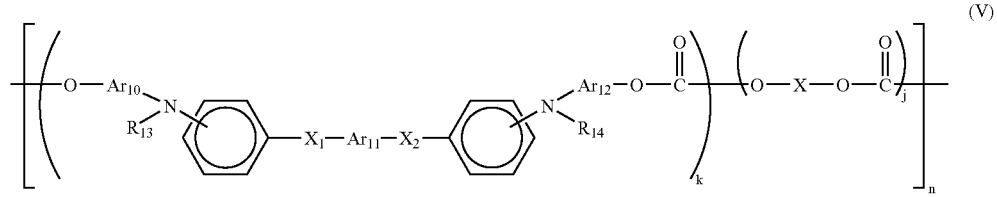

wherein, $R_{13}$ and $R_{14}$ represent a substituted or unsubstituted aryl group; $Ar_{10}$, $Ar_{11}$ and $Ar_{12}$ independently represent an arylene group; $X_1$ and $X_2$ represent a substituted or unsubstituted ethylene group, or a substituted or unsubstituted vinylene group; and X, k, j and n are same in formula (I);

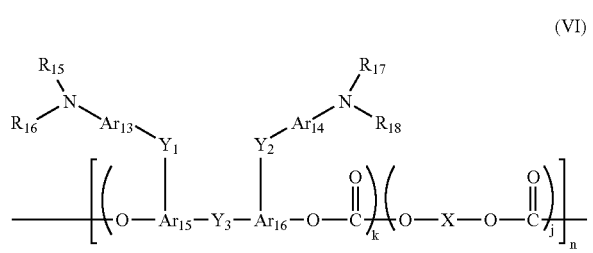

wherein, $R_{15}$, $R_{16}$, $R_{17}$ and $R_{18}$ represent a substituted or unsubstituted aryl group; $Ar_{13}$, $Ar_{14}$, $Ar_{15}$ and $Ar_{16}$ independently represent an arylene group; $Y_1$, $Y_2$ and $Y_3$ independently represent a direct bonding, a substituted or unsubstituted alkylene group, a substituted or unsubstituted cycloalkylene group, a substituted or unsubstituted alkylene ether group, an oxygen atom, a sulfur atom, or a vinylene group; and X, k, j and n are same in formula (I);

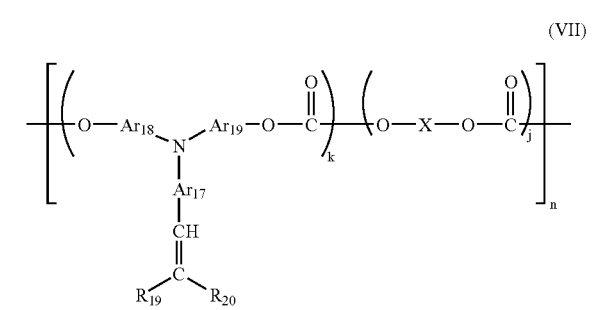

wherein, $R_{19}$ and $R_{20}$ represent a hydrogen atom, or substituted or unsubstituted aryl group, and $R_{19}$ and $R_{20}$ may form a ring; $Ar_{17}$, $Ar_{18}$ and $Ar_{19}$ independently represent an arylene group; and X, k, j and n are same in formula (I);

wherein, $R_{21}$ represents a substituted or unsubstituted aryl group; $Ar_{20}$, $Ar_{21}$, $Ar_{22}$ and $Ar_{23}$ independently represent an arylene group; and X, k, j and n are same in formula (I);

(IX)

wherein, $R_{22}$, $R_{23}$, $R_{24}$ and $R_{25}$ represent a substituted or unsubstituted aryl group; $Ar_{24}$, $Ar_{25}$, $Ar_{26}$, $Ar_{27}$ and $Ar_{28}$ independently represent an arylene group; and X, k, j and n are same in formula (I);

(X)

wherein, $R_{26}$ and $R_{27}$ independently represent a substituted or unsubstituted aryl group; $Ar_{29}$, $Ar_{30}$ and $Ar_{31}$ independently represent an arylene group; and X, k, j and n are same in formula (I).

In addition, other than the above-mentioned polymer CTMs, the polymer CTMs for use in the CTL include polymers finally having a two-dimensional or three-dimensional crosslinking structure, which is a monomer or an oligomer having an electron-releasing group when the CTL is formed and hardened or crosslinked after the CTL is formed.

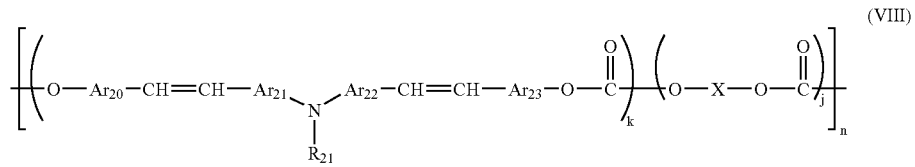

The CTL constituted of these polymers having an electron-releasing group or a crosslinking structure has a good abrasion resistance. Usually, in an electrophotographic process, charge potential (unexposed parts potential) is fixed, and when a surface of a photoreceptor is abraded due to repeated use, electric intensity increases in proportion to the abrasion. Accompanied with an increase of the electric intensity, occurrence of background fouling increases, and therefore, a photoreceptor having a high abrasion resistance has an advantage against the background fouling. The CTL constituted of these polymers having an electron-releasing group is easily coated because the CTL itself is a polymer compound. In addition, the CTL has a good charge transportability because of having a higher-density charge transport portion than a CTL constituted of a polymer in which a low-molecular-weight compound is dispersed. Therefore, a high-speed response can be expected from a photoreceptor having a CTL using a polymer CTM.

Other polymers having an electron-releasing group include copolymers of known monomers, block polymers, graft polymers, star polymers and crosslinked polymers having an electron-releasing group disclosed in Japanese Laid-Open Patent Publications Nos. 3-109406, 2000-206723 and 2001-34001.

The CTL in the present invention may include additives such as plasticizers and leveling agents. Specific examples of the plasticizers include known plasticizers, which are used for plasticizing resins, such as dibutyl phthalate and dioctyl phthalate. The addition quantity of the plasticizer is 0 to 30% by weight of the binder resin. Specific examples of the leveling agents include silicone oils such as dimethyl silicone oil and methyl phenyl silicone oil; polymers or oligomers including a perfluoroalkyl group in their side chain; and the like. The addition quantity of the leveling agents is 0 to 1% by weight of the binder resin.

Suitable binder resins include the resins mentioned above for use in the CTL 47. The resins mentioned above for use in the CGL 45 can be added as a binder resin. In addition, the charge transport polymer materials mentioned above can also be used as a binder resin. The content of the charge generation material is preferably from 5 to 40 parts by weight per 100 parts by weight of the binder resin. The content of the charge transport material is preferably from 0 to 190 parts by weight, and more preferably from 50 to 150 parts by weight per 100 parts by weight of the binder resin. A single-layered photosensitive layer can be formed by coating a coating liquid in which a charge generation material and a binder, and optionally a charge transport material, are dissolved or dispersed in a solvent such as tetrahydrofuran, dioxane, dichloroethane and cyclohexane by a coating method such as a dip coating, a spray coating and a bead coating method. The thickness of the photosensitive layer is preferably from about 5 to 100 µm.

In the photoreceptor of the present invention, an undercoat layer may be formed between the electroconductive substrate 41 and the photosensitive layer. The undercoat layer includes a resin as a main component. Since a photosensitive layer is typically formed on the undercoat layer by coating a liquid including an organic solvent, the resin in the undercoat layer preferably has good resistance to general organic solvents. Specific examples of such resins include water-soluble resins such as polyvinyl alcohol resins, casein and polyacrylic acid sodium salts; alcohol soluble resins such as nylon copolymers and methoxymethylated nylon resins; and thermosetting resins capable of forming a three-dimensional network such as polyurethane resins, melamine resins, alkyd-melamine resins and epoxy resins. The undercoat layer may include a fine powder of metal oxides such as titanium oxide, silica, alumina, zirconium oxide, tin oxide and indium oxide to prevent occurrence of moiré in the resultant images and to decrease residual potential of the photoreceptor.

The undercoat layer can also be formed by coating a coating liquid using a proper solvent and a proper coating method similarly to those for use in formation of the photosensitive layer mentioned above. The undercoat layer may be formed using a silane coupling agent, titanium coupling agent or a chromium coupling agent. In addition, a layer of aluminum oxide which is formed by an anodic oxidation method and a layer of an organic compound such as polyparaxylylene (parylene) or an inorganic compound such as SiO, $SnO_2$, $TiO_2$, ITO or $CeO_2$ which is formed by a vacuum evaporation method is also preferably used as the undercoat layer. The thickness of the undercoat layer is preferably 0 to 5 µm.

In the photoreceptor of the present invention, a protection layer 49 is optionally formed overlying the photosensitive layer. Suitable materials for use in the protection layer 49 include ABS resins, ACS resins, olefin-vinyl monomer copolymers, chlorinated polyethers, aryl resins, phenolic resins, polyacetal, polyamides, polyamideimide, polyacrylates, polyarylsulfone, polybutylene, polybutylene terephthalate, polycarbonate, polyarylate, polyethersulfone, polyethylene, polyethylene terephthalate, polyimides, acrylic resins, polymethylpentene, polypropylene, polyphenyleneoxide, polysulfone, polystyrene, AS resins, butadiene-styrene copolymers, polyurethane, polyvinyl chloride, polyvinylidene chloride, epoxy resins, etc. Among these resins, polycarbonate resins or polyarylate resins are preferably used.

Other than these resins, the protection layer 49 can include fluorocarbon resins such as polytetrafluoroethylene, silicone resins and materials constituted of these resins in which inorganic fillers such as titanium oxide, tin oxide, kalium titanate and silica or organic fillers are dispersed for the purpose of improving abrasion resistance thereof.

Specific examples of the organic fillers include powders of fluorocarbon resins such as polytetrafluoroethylene, silicone resin powders and a-carbon powders. Specific examples of the inorganic fillers include powders of metals such as copper, tin, aluminum and indium; metal oxides such as silica, tin oxide, zinc oxide, titanium oxide, indium oxide, antimony oxide, bismuth oxide, tin oxide doped with antimony, indium oxide doped with tin and potassium titanate. Among these fillers, inorganic fillers are preferably used in view of their hardness. In particular, silica, titanium oxide and alumina are preferably used. Further, α-alumina having a hexagonal close-packed structure is more preferably used.

Although concentration of the filler in the protection layer depends on a kind of the filler and electrophotographic process conditions using the resultant photoreceptor, the filler preferably has a content of from 5 to 50% by weight, and more preferably from 10 to 30% by weight based on total weight of solid contents in most surface of the protection layer.

In addition, the filler preferably has a volume-average particle diameter of from 0.1 to 2 µm, and more preferably from 0.3 to 1 µm. When the average particle diameter is too small, the protection layer does not have sufficient abrasion resistance. When too large, the protection layer has a poor surface smoothness and cannot be formed in some cases.

The average particle diameter of the filler in the present invention is a volume-average particle diameter thereof unless otherwise specified, and measured by an ultracentrifugal automatic particle-size-distribution measurer CAPA-700 from Horiba, Ltd. This is determined as a particle diameter which is equivalent to 50% of cumulative distribution (Median value). Further, it is important that a standard deviation of each particle measured at the same time is not greater than 1 µm. When the standard deviation is greater than 1 µm, the particle diameter distribution is so wide that the effect of the present invention is not occasionally exerted.

pH of the filler largely affects resolution of the resultant image and dispersibility of the filler. It is considered that one of the reasons is that a hydrochloric acid and the like acid remain in the filler, particularly in the metal oxide. When the remaining amount of the acids is large, production of the resultant blurred images cannot be avoided, and dispersibility of the filler is occasionally influenced thereby depending on the remaining amount.

The other reason is a difference of chargeability of the filler, particularly the metal oxide. Usually, particles dispersed in a liquid are positively or negatively charged, and ions having a contrarious charge gather to keep the particles neutral. Then, an electric double layer is formed to stabilize the dispersibility of the particles. As the layer leave from the particles, the potential (zeta potential) gradually decreases and a potential of an electrically neutral area sufficiently apart from the particles becomes zero. Therefore, when an absolute value of the zeta potential increases, a force of repulsion of the particles increases and stability thereof increases. As the zeta potential closes to zero, the particles tend to agglutinate and become unstable.

On the other hand, according to pH of the dispersion liquid, the zeta potential largely fluctuates. The potential becomes zero at a certain pH and the dispersion liquid has an isoelectric point. Therefore, the particles are kept away from the isoelectric point as far as possible to stabilize the dispersion liquid.

In the present invention, the filler preferably has a pH at least not less 5 at the isoelectric point to prevent the resultant blurred images, and the effect increases when the filler is more basic. Dispersibility and stability of the basic filler having a high pH improves when the dispersion liquid is acidic because the zeta potential more increases.

pH values of the filler in the present invention are values from the zeta potential to isoelectric point, and the zeta potential is measured by a laser zeta electrometer from Otsuka Electronics Co., Ltd.

In order to prevent occurrence of blurred images, fillers having a relatively high specific resistance not less than $10^{10}$ Ω·cm are preferably used in the protection layer. In addition, fillers having a pH not less than 5 or a dielectric constant not less than 5 are preferably used. These fillers can be used alone or in combination. For example, a combination of two or more kinds of a filler having a pH not less than 5 and a filler having a pH not greater than 5; or a combination of two or more kinds of a filler having a dielectric constant not less than 5 and a filler having a dielectric constant not greater than 5 can be used. Among these fillers, α-form alumina, which has a hexagonal close-packed structure, is preferably used to improve abrasion resistance of the resultant protection layer and to prevent the blurred image problem, because the alumina has high insulation property, heat stability and good abrasion resistance.

Resistivity of the filler for use in the present invention is determined as follows. Because a powder like the filler has a different resistivity according to the filling factor, the resistivity has to be measured under fixed conditions. In the present invention, a measurer having an equivalent structure to a measurer disclosed in each FIG. 1 of Japanese Laid-Open Patent Publications Nos. 5-94049 and 5-113688 is used to measure the resistivity of the filler. The measurer has an electrode area of 4.0 cm². An amount of a sample is controlled such that a distance between the electrodes is 4 mm by applying a load of 4 kg to one of the electrodes for 1 min before measured. The measurement is performed on loaded status of the upper electrode having a weight of 1 kg with an applied voltage of 100 V. A scope not less than $10^6$ Ω·cm is measure by HIGH RESISTANCE METER from Yokogawa Hewlett Packard Ltd. and a scope less than that is measure by Digital Multimeter from Fluke Corp.

Dielectric constant of the filler is measured as follows. A cell which is similar to that used in the measurement of resistivity is used, and capacitance is measured after a load is applied thereto to measure the dielectric constant. The capacitance is measure by a dielectric loss measurer from Ando Electric Co., Ltd.

Further, the fillers are preferably treated with at least one surface treating agent to improve the dispersibility thereof. Deterioration of dispersibility of a filler included in the protection layer causes not only increase of residual potential but also decrease of transparency of the protection layer, generation of coating deficiencies and deterioration of abrasion resistance. Therefore, a photoreceptor having good durability and capable of producing good images cannot be provided. Suitable surface treating agents include known surface treating agents, but surface treating agents which can maintain the insulating properties of the filler in the protection layer are preferably used. Specific examples of such surface treating agents include titanate coupling agents, aluminum coupling agents, zircoaluminate coupling agents, higher fatty acids, and combinations of these agents with silane coupling agents; and $Al_2O_3$, $TiO_2$, $ZrO_2$, silicones, aluminum stearate, and their mixtures. These are preferably used because of being capable of imparting good dispersibility to fillers and preventing blurred images. When silane coupling agents are used, the blurred image problem tends to occur. However, when used in combination with the surface treating agents mentioned above, there is a case in which the problem can be avoided. The content of a surface treating agent in a coated filler, which depends on the primary particle diameter of the filler, is from 3 to 30% by weight, and more preferably from 5 to 20% by weight. When the content is too low, good dispersibility cannot be obtained. To the contrary, when the content is too high, residual potential seriously increases. These fillers can be used alone or in combination. An amount of the surface treatment of the filler is determined by a weight ratio of the surface treating agents to an amount of the filler.

The filler materials can be dispersed by a proper disperser. In addition, it is preferable that the filler is dispersed to primary particles and has less agglutinated bodies in respect of transmittance of the protection layer.

The protection layer 49 may include a CTM to decrease residual potential and to improve the response of the resultant photoreceptor. The CTMs mentioned above for use in the CTL can be used. When a low-molecular-weight CTM is used in the protection layer, the concentration gradient of the low-molecular-weight CTM may be formed therein. In this case, it is preferable that the concentration of the CTM at the surface of the protection layer is lower than that at the bottom thereof to improve the abrasion resistance of the resultant photoreceptor. The concentration is a weight ratio of the low-molecular-weight CTM to a total weight of the all the materials included in the protection layer. The concentration gradient means such a gradient as lowers the concentration of the CTM at the surface of protection layer.

In addition, using a charge transport polymer material is quite advantageous to increase durability of the resultant photoreceptor. When the protection layer includes only the charge transport polymer material besides the filler, the resultant photoreceptor has not only high mechanical abrasion resistance but also high chemical stability. The charge transport polymer material has less chemical reactivity than the low-molecular-weight CTM and has high resistance against an oxide gas generated by a charger and a sputtering effect due to a discharge thereby. When a photoreceptor has a surface layer having a high abrasion resistance such as a protection layer, blurred image problems due to a repeated use frequently occur. It is considered to that this is due to adherence of the oxide gas and a low-resistant material to a surface of the photoreceptor. However, the protection layer including only the filler and the charge transport polymer material decreases the adherence site and exerts a high effect on the blurred image.

The protection layer is formed by a conventional coating method. The protection layer preferably has a thickness of from 0.1 to 10 μm. In addition, a protection layer formed by a vacuum thin film forming method using known materials such as a-C and a-SiC can be used.

As mentioned above, a photosensitive layer (CTL) including a polymer CTM or a protection layer formed on a surface of a photoreceptor not only increases durability (abrasion resistance) of the photoreceptor but also exerts a new effect when used in a tandem-type full-color image forming apparatus, which is not available in a monochrome image forming apparatus.

In the full-color image forming apparatus, various modes of images are input and formulaic images are also input, e.g., proof marks in Japanese documents. Such proof marks are usually located at the edges of the images and the colors are limited. Further, a tandem-type full-color image forming apparatus prevails and a printing speed thereof improves, and many business documents having, e.g., a company logo are produced. In such a case, a specific part is repeatedly printed and an uneven use of the photoreceptor becomes large. When random images are always written in a photoreceptor, image writing, development and transfer are performed thereon on average. When images are repeatedly written in a specific part of the photoreceptor or only specific image forming elements thereof are used, a balance of durability thereof is lost. When a photoreceptor not having so (physically, chemically and mechanically) durable a surface in such conditions, the balance loss becomes large and causes image problems. On the other hand, a photoreceptor having a high durability has less local loss and produces less defective images.

In the present invention, an intermediate layer can be formed between the photosensitive layer and the protection layer. The intermediate layer includes a resin as a main component. Specific examples of the resin include polyamides, alcohol soluble nylons, water-soluble polyvinyl butyral, polyvinyl butyral, polyvinyl alcohol, etc. The intermediate layer can be formed by one of the above-mentioned known coating methods. The thickness of the intermediate layer is preferably from 0.05 to 2 μm.

Hereinafter, the electrophotographic method and electrophotographic apparatus of the present invention will be explained referring to drawings.

Figure 3:
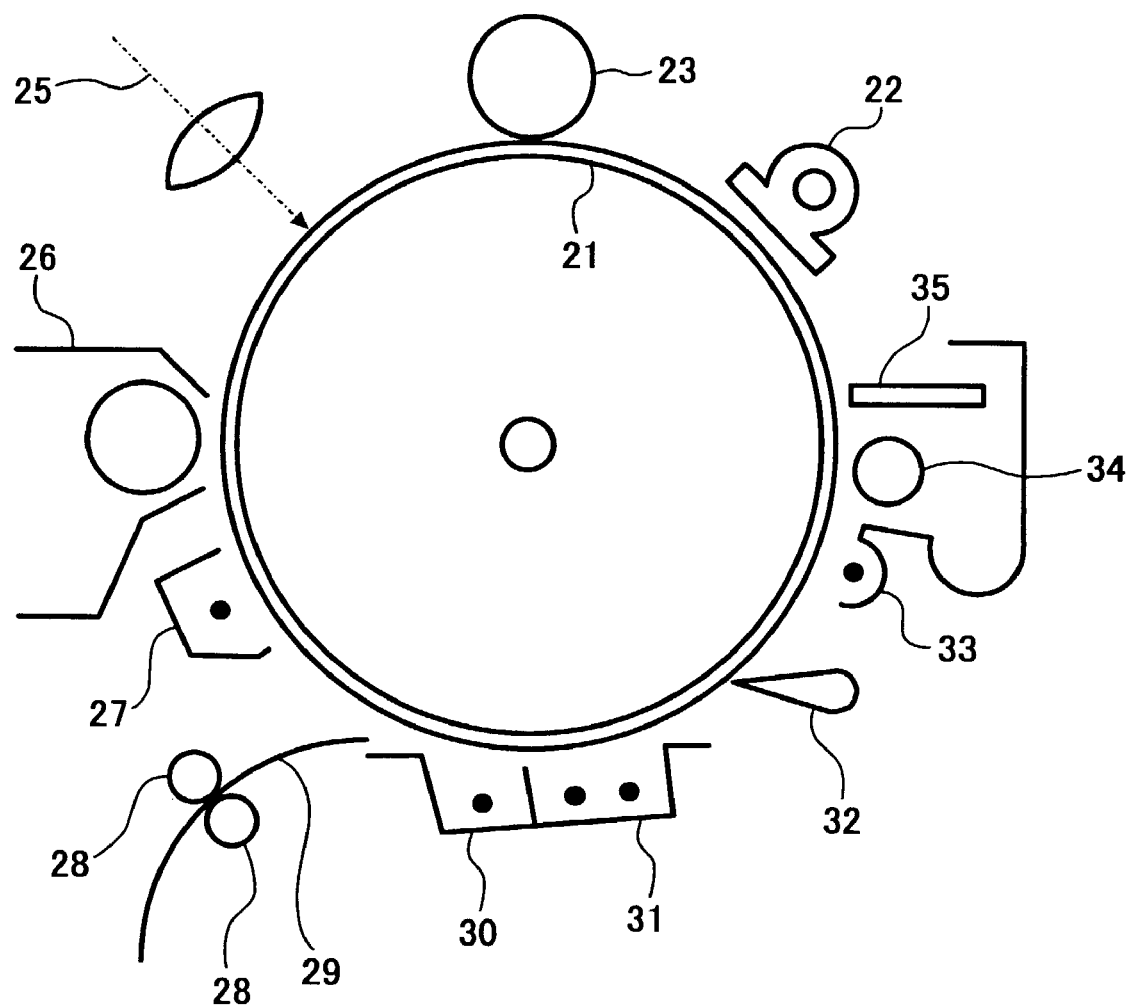
FIG. 3 is a schematic view illustrating a cross section of an embodiment of the electrophotographic apparatus for explaining the electrophotographic process of the present invention.

FIG. 3 is a schematic view illustrating a cross section of an embodiment of the electrophotographic apparatus for explaining the electrophotographic process of the present invention, and modified embodiments are included in the present invention.

In FIG. 3, a photoreceptor 21 is formed of a CGL including a titanylphthalocyanine crystal having an average primary particle diameter not greater than 0.2 μm and a CTL on an electroconductive substrate. Known means such as corotrons, scorotrons, solid state chargers and charging rollers are used for a charging member 23, a pre-transfer charger 27, transfer charger 30, a separation charger 31 and a pre-cleaning charger 33. The charging member preferably contacts the photoreceptor or is located closely thereto. It is preferable that a DC voltage overlapped with an AC voltage is applied to the photoreceptor to reduce uneven charging. Particularly, in the tandem-type full-color image forming apparatus, the uneven charging causes a large problem of deterioration of color balance (color reproducibility) in addition to uneven density of halftone images occurred in a monochrome image forming apparatus. Overlapping an AC voltage with a DC voltage largely improves the problem. However, when properties of the AC voltage such as frequencies and peak voltages are too large, a hazard to the photoreceptor becomes large, which occasionally accelerates deterioration of the photoreceptor. Therefore, the AC voltage overlapping has to be a minimum required.

The contact charging member is a member contacting its surface to that of the photoreceptor, and has the shape of a charging roller, charging blade and a charging brush. Particularly, the charging rollers and brushes are preferably used.

The charging member located closely to the photoreceptor is a non-contact member such that there is a gap of not greater than 200 μm between the surfaces of the photoreceptor and the charging member. When the gap is too large, the photoreceptor is unstably charged. When too small, a residual toner on the photoreceptor contaminates the surface of the charging member. Therefore, the gap is preferably from 10 to 200 μm, and more preferably from 10 to 100 μm. According to a length of the gap, known charge wire type chargers such as corotrons and scorotrons and the contact charging members such as charging rollers, charging brushes and charging blades are separately used.

Figure 4:
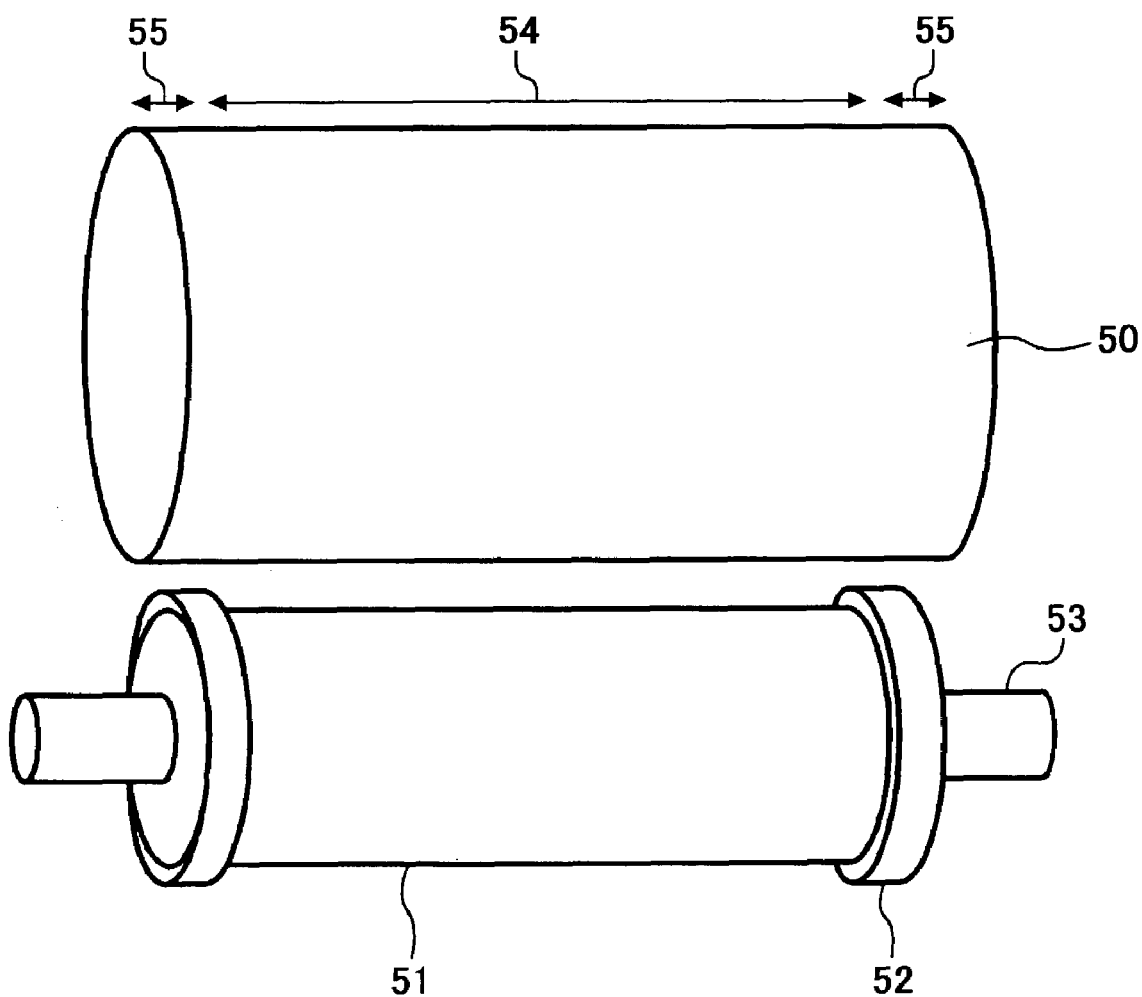
FIG. 4 is a schematic view illustrating an embodiment of the charger located closely to the photoreceptor, which has gap forming members for use in the present invention.

The charging member located closely to a photoreceptor for use in the present invention may have any shape provided that the gap from the photoreceptor can be properly controlled. For example, rotation axes of the photoreceptor and charging member may mechanically be fixed such that there is a proper gap. Simple methods of stably maintaining the gap include a method of using a charging roller having a gap forming member at both non-image forming ends thereof, which only contact the surface of photoreceptor such that the image forming area thereof does not contact the member, or a method of locating the gap forming members at both non-image forming ends of the photoreceptor, which only contact the surface of the charging member such that the image forming area does not contact the charging member. Particularly, methods disclosed in Japanese Laid-Open Patent Publications Nos. 2002-148904 and 2002-148905 are preferably used. An embodiment of the charger located closely to the photoreceptor, which has a gap forming member is shown in FIG. 4.

As a transferer, the above-mentioned chargers can typically be used, and as FIG. 3 shows, a combination of the transfer charger 30 and the separation charger 31 is preferably used.

Suitable light sources for use in an irradiator 25 include laser diodes (LDs) and light emitting diodes (LEDs). Suitable light sources for use in a discharging lamp 22 include general light-emitting materials such as fluorescent lamps, tungsten lamps, halogen lamps, mercury lamps, sodium lamps, LEDs, LDs, light sources using electroluminescence (EL), etc. In addition, in order to obtain light having a desired wave length range, filters such as sharp-cut filters, band pass filters, near-infrared cutting filters, dichroic filters, interference filters, color temperature converting filters, etc. can be used.

The above-mentioned light sources can be used for not only the process illustrated in FIG. 3, but also other processes such as a transfer process, a discharging process, a cleaning process, a pre-exposure process including light irradiation to the photoreceptor.

When a toner image formed on the photoreceptor 21 by a developing unit 26 is transferred onto a transfer sheet 29, all of the toner image is not transferred thereto, and a residual toner remains on the surface of the photoreceptor 21. The residual toner is removed from the photoreceptor by the fur brush 34 and the cleaning blade 35. The residual toner remaining on the photoreceptor 21 can be removed by only a cleaning brush. Suitable cleaning brushes include known cleaning brushes such as fur brushes and mag-fur brushes.

When the photoreceptor positively (or negatively) charged is exposed to imagewise light, an electrostatic latent image having a positive (or negative) charge is formed on the photoreceptor. When the latent image having a positive (or negative) charge is developed with a toner having a negative (or positive) charge, a positive image can be obtained. In contrast, when the latent image having a positive (negative) charge is developed with a toner having a positive (negative) charge, a negative image can be obtained.

As the developing method, known developing methods can be used. In addition, as the discharging methods, known discharging methods can also be used.

Figure 5:
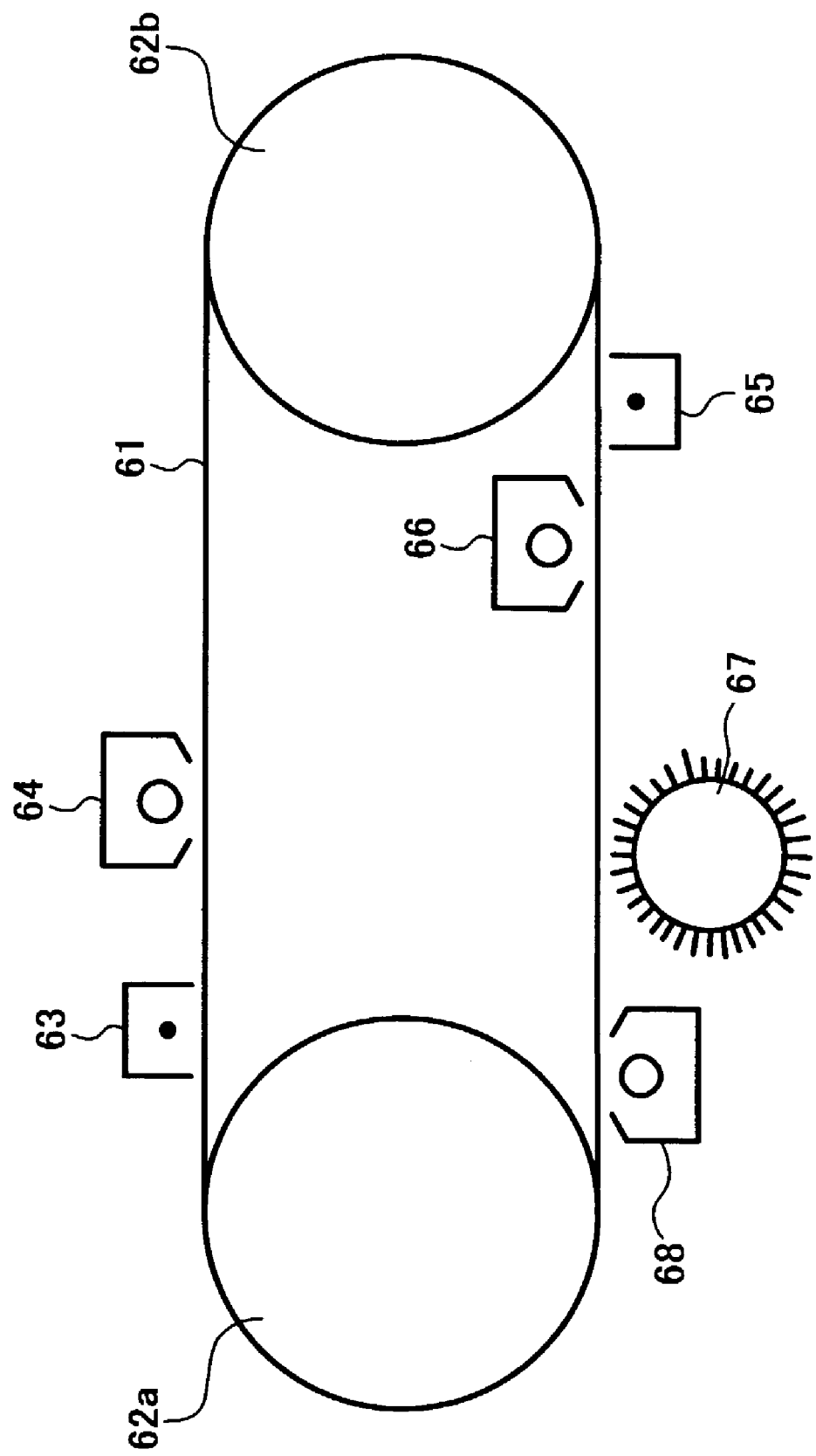
FIG. 5 is a schematic view illustrating another embodiment of the electrophotographic process of the present invention.

FIG. 5 is a schematic view illustrating another embodiment of the electrophotographic process of the present invention. A photoreceptor 61 is formed of a CGL including a titanylphthalocyanine crystal having an average primary particle diameter not greater than 0.2 μm and a CTL on an electroconductive substrate. The photoreceptor is rotated by rollers 62a and 62b. Charging using a charger 63, imagewise exposure using an imagewise light irradiator 64, developing using an image developer (not shown), transferring using a transfer charger 65, pre-cleaning using a light source 66, cleaning using a cleaning brush 67 and discharging using a discharging light source 68 are repeatedly performed. In FIG. 5, the pre-cleaning light irradiation is performed from the side of the substrate of the photoreceptor 61. In this case, the substrate has to be light-transmissive. LDs or LEDs are preferably used for the imagewise light irradiator 64.

The image forming process of the present invention is not limited to the embodiments as shown in FIGS. 3 and 5. For example, although the pre-cleaning light irradiation is performed from the substrate side in FIG. 5, the pre-cleaning light irradiation can be performed from the photosensitive layer side of the photoreceptor. In addition, the light irradiation in the imagewise light irradiation process and the discharging process may be performed from the substrate side of the photoreceptor As light irradiation processes, the imagewise irradiation, pre-cleaning irradiation and discharging light irradiation are illustrated. In addition, a pre-transfer light irradiation and a preliminary light irradiation before the imagewise light irradiation, and other known light irradiation processes may also be performed on the photoreceptor.

Figure 6:
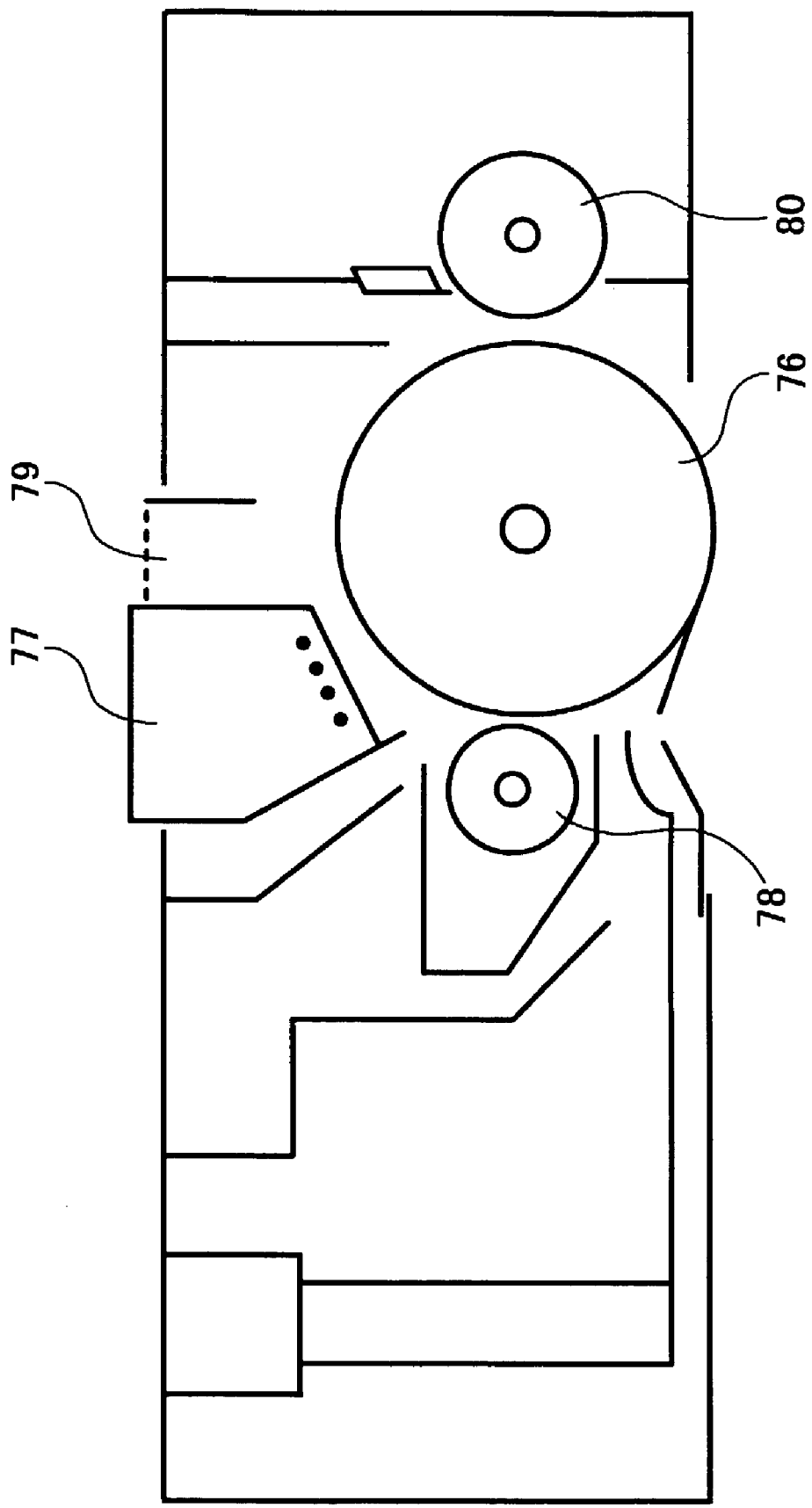
FIG. 6 is a schematic view illustrating an embodiment of the process cartridge of the present invention.

The above-mentioned image forming units may be fixedly set in a copier, a facsimile or a printer. However, the image forming units may be set therein as a process cartridge. The process cartridge means an image forming unit (or device) including at least a photoreceptor, and one of a charger, an imagewise light irradiator, an image developer, an image transferer, a cleaner and a discharger. Various process cartridges can be used in the present invention. FIG. 6 illustrates an embodiment of the process cartridge. A photoreceptor 76 is formed of a CGL including a titanylphthalocyanine crystal having an average primary particle diameter not greater than 0.2 μm and a CTL on an electroconductive substrate.

Figure 7:
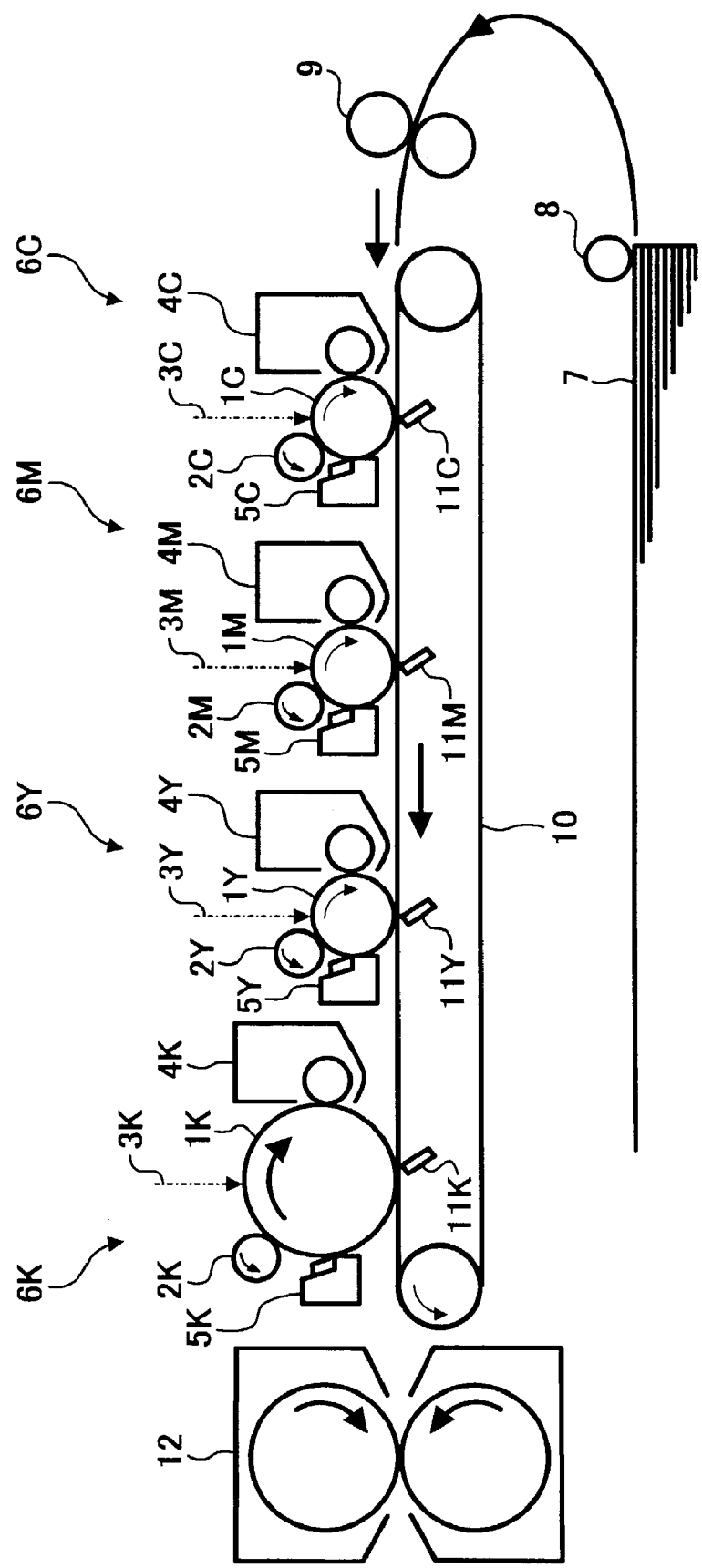
FIG. 7 is a schematic view illustrating an embodiment of the tandem-type full-color image forming apparatus of the present invention.

FIG. 7 is a schematic view illustrating an embodiment of the tandem-type full-color image forming apparatus of the present invention, and the following modified embodiment is included in the present invention.

In FIG. 7, numerals 1C, 1M, 1Y and 1K represent drum-shaped photoreceptors, and rotated in the direction indicated by an arrow. Around the photoreceptors, chargers 2C, 2M, 2Y and 2K; image developers 4C, 4M, 4Y and 4k; and cleaners 5C, 5M, 5Y and 5K are arranged in a rotation order thereof. The chargers 2C, 2M, 2Y and 2K uniformly charge surfaces of the photoreceptors. Laser beams 3C, 3M, 3Y and 3K from irradiators (not shown) irradiate the surfaces of the photoreceptors between the chargers 2C, 2M, 2Y and 2K and image developers 4C, 4M, 4Y and 4k to form electrostatic latent images on the surfaces of the photoreceptors 1C, 1M, 1Y and 1K. Four image forming units 6C, 6M, 6Y and 6K including the photoreceptors 1C, 1M, 1Y and 1K are arranged along a transfer feeding belt 10 feeding a transfer material. The transfer feeding belt 10 contacts the photoreceptors 1C, 1M, 1Y and 1K between the image developers 4C, 4M, 4Y and 4k and cleaners 5C, 5M, 5Y and 5K of the image forming units 6C, 6M, 6Y and 6K. Transfer brushes 11c, 11M, 11Y and 11K are arranged on a backside of the transfer feeding belt 10, which is an opposite side to the photoreceptors, to apply a transfer bias to the transfer feeding belt 10. The image forming units 6C, 6M, 6Y and 6K just handle different color toners respectively, and have the same structures.

In the full-color electrophotographic apparatus in FIG. 7, images are formed as follows. First, in the image forming units 6C, 6M, 6Y and 6K, the photoreceptors 1C, 1M, 1Y and 1K are charged by the chargers 2C, 2M, 2Y and 2K rotating in the same direction of the photoreceptors. Next, the laser beams 3C, 3M, 3Y and 3K from irradiators (not shown) irradiate the surfaces of the photoreceptors to form electrostatic latent images having different colors respectively thereon. Then, the image developers 4C, 4M, 4Y and 4k develop the electrostatic latent images to form toner images. The image developers 4C, 4M, 4Y and 4k develop the electrostatic latent images with toners having a cyan color C, a magenta color M, a yellow color Y and a black color K respectively. The color toner images respectively formed on the photoreceptors 11C, 1M, 1Y and 1K are overlaid on a transfer sheet 7. The transfer sheet 7 is fed by a paper feeding roller 8 from a tray and stopped once by a pair of resist rollers 9, and fed onto the transfer feeding belt 10 in timing with formation of the toner images on the photoreceptors. The transfer sheet 7 borne by the transfer feeding belt 10 is transferred to the contact (transfer) position of each photoreceptor 1C, 1M, 1Y and 1K, where each color toner image is transferred onto the transfer sheet 7. The toner images on the photoreceptors are transferred to the transfer sheet 7 by an electric field formed with a potential difference between the transfer bias applied by the transfer brushes 11C, 11M, 11Y and 11K and the photoreceptors 1C, 1M, 1Y and 1K. The transfer sheet 7 having passed the four transfer positions and bearing the four color toner images overlaid thereon is fed to a fixer 12 fixing the toner images on the transfer sheet. The transfer sheet 7 on which the toner images are fixed is fed onto a sheet receiver (not shown). Residual toners remaining on the photoreceptors 1C, 1M, 1Y and 1K, which were not transferred on the transfer sheet at the transfer position are collected by the cleaners 5C, 5M, 5Y and 5K. In an embodiment in FIG. 7, the image forming units are lined in order of C, M, Y and K from an upstream to a downstream of feeding direction of the transfer sheet. However, the order is not limited thereto and the color orders are optional. When only a black image is produced, the image forming units 6C, 6M and 6Y except for 6K can be stopped in the apparatus of the present invention. In FIG. 7, the charger contacts the photoreceptor, however, a gap therebetween of from 10 to 200 μm can decrease an abrasion amount thereof and toner filming over the charger.

The above-mentioned image forming units may be fixedly set in a copier, a facsimile or a printer. However, the image forming units may be set therein as a process cartridge. The process cartridge means an image forming unit (or device) including at least a photoreceptor, and one of a charger, an imagewise light irradiator, an image developer, an image transferer, a cleaner and a discharger.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

292 parts of 1,3-diiminoisoindoline and 1,800 parts of sulfolane were mixed, and 204 parts of titaniumtetrabutoxide were dropped into the mixture under a nitrogen gas stream. The mixture was gradually heated until the mixture had a temperature of 180° C. and stirred for 5 hrs while the reaction temperature was maintained from 170 to 180° C. After the mixture was cooled, a precipitated material (powder) was filtered and washed with chloroform until the powder became blue. Next, the powder was washed with methanol for several times, and further washed with hot water having a temperature of 80° C. for several times to prepare a crude titanylphthalocyanine pigment.

60 parts of the crude titanylphthalocyanine pigment was mixed in 1,000 parts of sulfuric acid having a concentration of 96% and stirred therein at a temperature of from 3 to 5.degree. C. to dissolve the pigment therein, and the mixture was filtered to prepare a sulfuric acid solution. The sulfuric acid solution was dropped in 35,000 parts of iced water while stirred, and a precipitated crystal was filtered. Then, the crystal was repeatedly washed with water until the water became neutral to prepare a water paste of a titanylphthalocyanine pigment.

1,500 parts of tetrahydrofuran were included in the water paste and the mixture was strongly stirred by a homomixer (MARK II model from KENIS CO., LTD.) at 2,000 rpm at a room temperature for 20 min until a color of the water paste changed from navy blue to pale blue. Then, the stir was stopped and the mixture was immediately filtered at a reduced pressure. A crystal after the filtration was washed with tetrahydrofuran to prepare 98 parts of a wet cake of the pigment. The wet cake of the pigment was dried at 70° C. under a reduced pressure (5 mm Hg) for 2 days to prepare 78 parts of a titanylphthalocyanine crystal. This is a Pigment 1. Pigment 1 contains 657 ppm tetrahydrofuran.

Pigment 1 was crushed with a mortar to be microparticulated. The microparticulated sample of Pigment 1 (about 0.5 mg) was examined by thermal extraction-gas chromatographic-mass spectrometric assay under the following conditions.

| <Thermal Extraction> | |
|---|---|
| Extraction Temperature | 250° C. |
| Extraction Time | 10 min |
| <Apparatus> | |
| Shimadzu Corp. QP5000 | Shimadzu CLASS-5000 |
| Data Processing: | (Wiley229Lib.) |
| <Column> | |
| UltraALLOY-FFAP | L = 30 m I.D = 0.25 mm Film = 0.25 μm |
| <Column Temperature> | 50° C. (for 2 min) to 250° C. (20° C./min) |
| <Carrier Gas Pressure> | 80 kPa (for 2 min) to 120 kPa (4 kPa/min) |
| <Ionization Method> | EI method (70 eV) |
| <Split Ratio> | 1:50 |
| <Measurement Method> | Selected Ion Measurement Method |
| <Measured Ion> | THF-discriminative m/z = 71.15, 72.15 and 42.10 |

A peak area obtained from the assay was converted to a weight, and a weight ratio thereof to the weight of the sample was determined. The peak area observed from the thermal extraction-gas chromatographic-mass spectrometric assay showed that Pigment 1 contained 657 ppm tetrahydrofuran.

Example 2

The procedures of preparation for the titanylphthalocyanine crystal in Example 1 were repeated except for changing the crystal conversion solvent from the tetrahydrofuran to toluene to prepare a titanylphthalocyanine crystal. This is a Pigment 2.

Example 3

The procedures of preparation for the titanylphthalocyanine crystal in Example 1 were repeated except for changing the crystal conversion solvent from the tetrahydrofuran to dichloromethane to prepare a titanylphthalocyanine crystal. This is a Pigment 3.

Comparative Example 1

The procedures of preparation for the titanylphthalocyanine crystal in Example 1 were repeated except for changing the crystal conversion solvent from the tetrahydrofuran to 2-butanone to prepare a titanylphthalocyanine crystal. This is a Pigment 4.

Comparative Example 2

The procedures of preparation for the titanylphthalocyanine crystal in Example 1 were repeated except that the crystal conversion time by the tetrahydrofuran was 4 hrs in accordance with the Synthesis Example 1 disclosed in Japanese Laid-Open Patent Publication No. 2001-19871 to prepare a titanylphthalocyanine crystal. This is a Pigment 5.

Comparative Example 3

The procedures of preparation for the titanylphthalocyanine crystal in Example 1 were repeated except that the crystal conversion time by the tetrahydrofuran was 4 hrs in accordance with the Synthesis Example 1 disclosed in Japanese Laid-Open Patent Publication No. 2001-19871, and further the mixture was left for a day and filtered to prepare a titanylphthalocyanine crystal. This is a Pigment 6.

A part of the water paste prepared in Example 1 was diluted with ion exchange water so as to have about 1% by weight. A surface of the diluted water paste was scooped with a copper net subjected to an electroconductive treatment to observe particle sizes of the titanylphthalocyanine with a TEM (H-9000NAR from Hitachi, Ltd.) of 75,000 magnifications. The average particle size was determined as follows.

The observed TEM image was photographed to randomly select 30 titanylphthalocyanine particles having a shape close to a needle, and a major axis of each particle was measured. An arithmetic average of the major axes of the 30 particles was determined as the average particle size.

The average particle size measured by this method in the water paste in Example 1 was 0.06 μm.

The crystal converted titanylphthalocyanine crystals just before filtration in Examples 1 to 3 and Comparative Examples 1 to 3 were observed by a TEM in the same method of the water paste after diluted with the respective crystal conversion solvents so as to have 1% by weight. The average particle sizes are shown in Table 1. Different from the water pastes, the titanylphthalocyanine crystals prepared in Examples 1 to 3 and Comparative Examples 1 to 3 had different forms such as forms close to a triangle and forms close to a quadrangle. Therefore, the longest diagonal of the crystal was determined as the major axis.

TABLE 1

| | Average Particle Size (μm) | Remarks |
|---|---|---|
| Example 1 | 0.14 | The particle sizes were almost uniform. |
| Example 2 | 0.12 | The particle sizes were almost uniform. |
| Example 3 | 0.15 | The particle sizes were almost uniform. |

TABLE 1-continued

| | Average Particle Size (μm) | Remarks |
|---|---|---|
| Comparative Example 1 | 0.16 | The particle sizes were almost uniform. |
| Comparative Example 2 | 0.25 | The particle sizes included large sizes Of from about 0.3 to 0.4 μm. |
| Comparative Example 3 | 0.38 | The particle sizes included huge sizes not less than 0.5 μm. |

A part of the water paste prepared in Example 1 was dried at 80° C. under a reduced pressure (5 mm Hg) for 2 days to prepare a titanylphthalocyanine powder having a low crytallinity.

X-ray diffraction spectra of the dried powder and the titanylphthalocyanine crystals prepared in Examples 1 to 3 and Comparative Examples 1 to 3 were measured by the following conditions.

Figure 8:
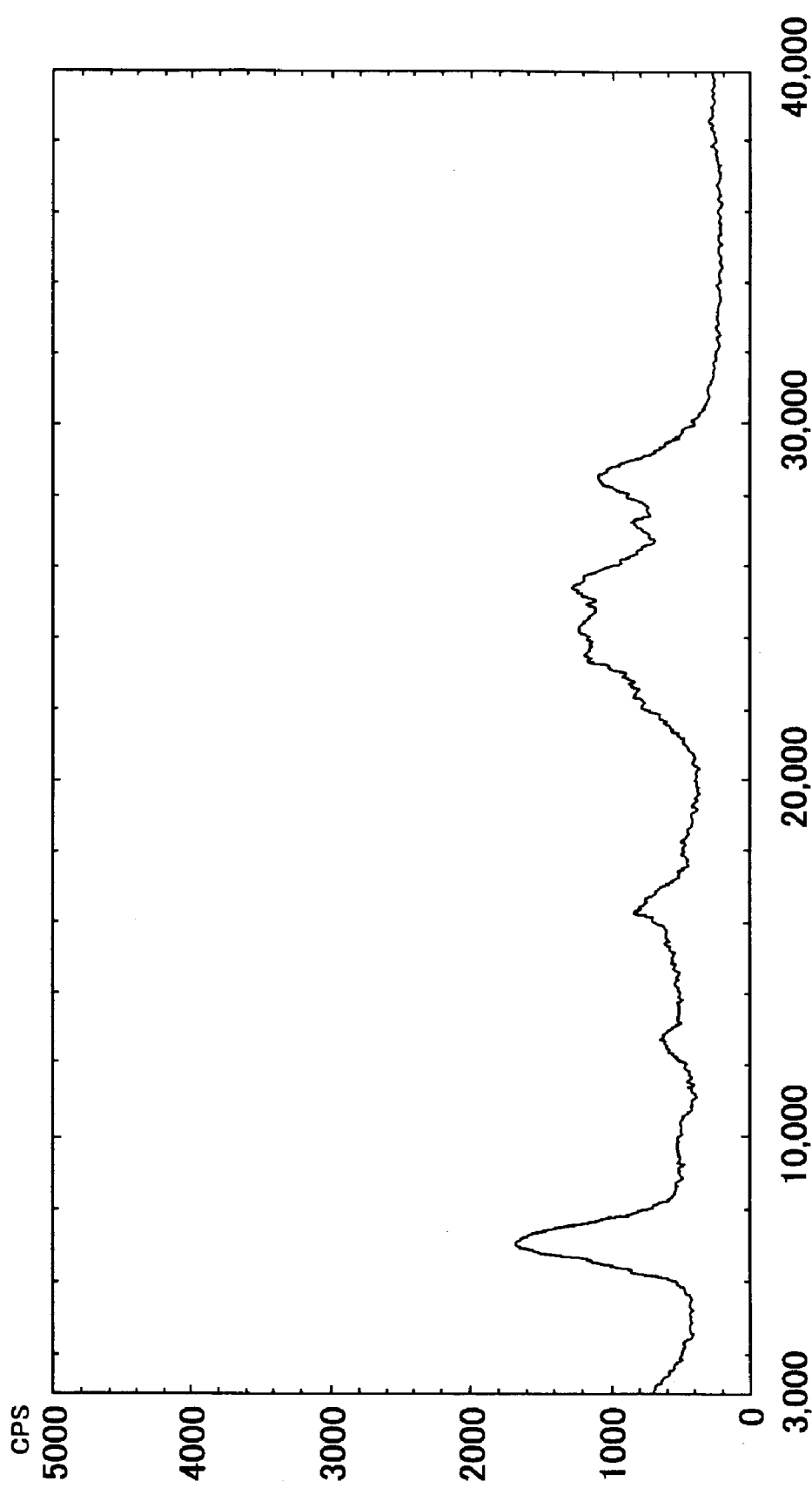
FIG. 8 is a diagram showing an X-ray spectrum of the dry powder of water paste of the titanylphthalocyanine pigment.

X-ray tube: Cu
Voltage: 40 kV
Current: 20 mA
Scanning speed: 1°/min
Scanning range: 3 to 40°
Time constant: 2 sec The X-ray diffraction spectrum of the dried powder of the water paste is shown in FIG. 8.

Figure 9:
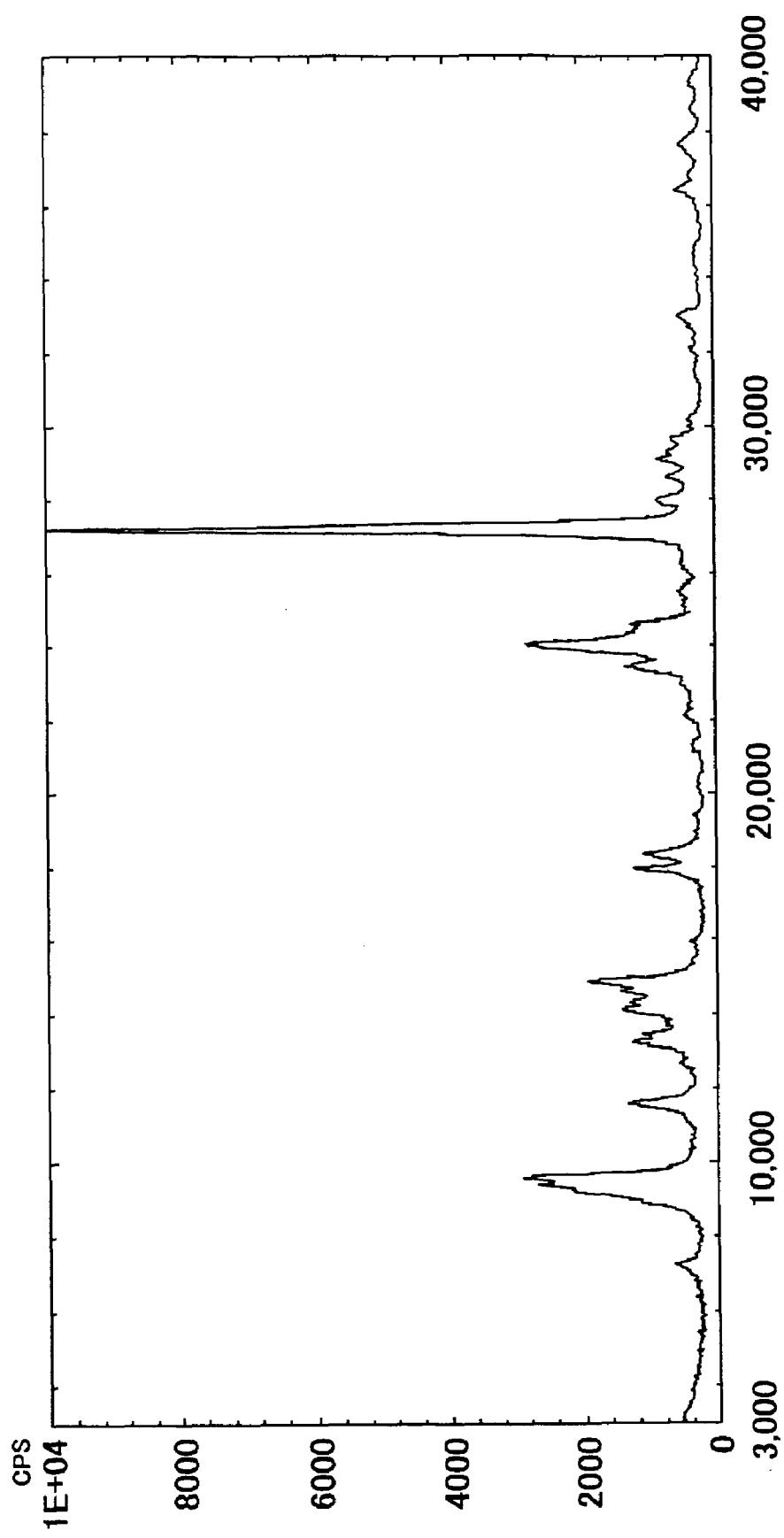
FIG. 9 is a diagram showing an X-ray spectrum of the titanylphthalocyanine crystal prepared in Example 1.

Because the titanylphthalocyanine crystals prepared in Examples 1 to 3 and Comparative Examples 2 and 3 had the same X-ray diffraction spectra, the X-ray diffraction spectrum of the titanylphthalocyanine crystal prepared in Example 1 is shown in FIG. 9 as a representative example.

Figure 10:
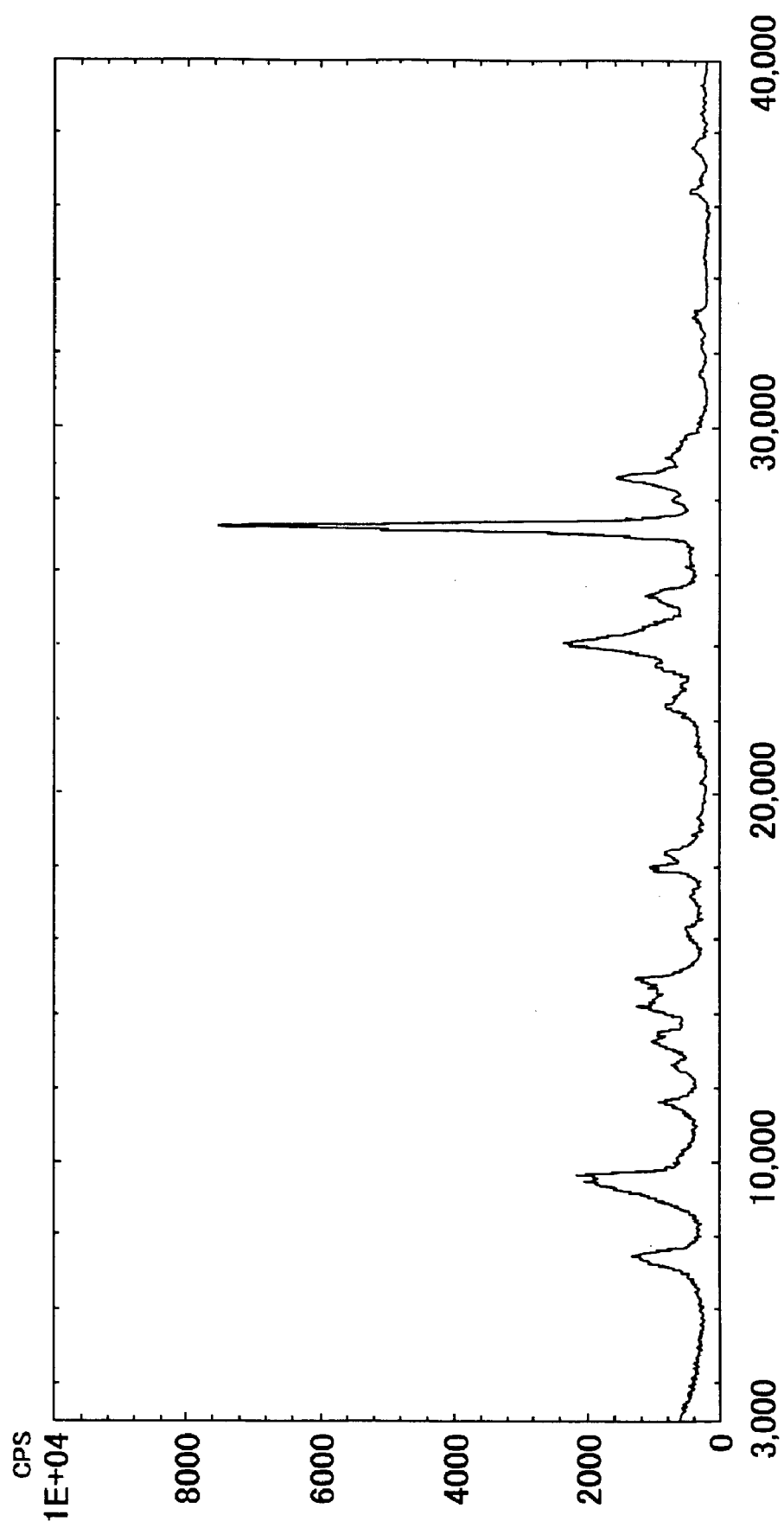
FIG. 10 is a diagram showing an X-ray spectrum of the titanylphthalocyanine crystal prepared in Comparative Example 1.

The titanylphthalocyanine crystal prepared in Comparative Example 1 had a different X-ray diffraction spectrum from those of the Examples 1 to 3 and Comparative Examples 2 and 3, i.e., had a minimum angle at 7.5°. This is shown in FIG. 10.

Comparative Example 4

A pigment was prepared in accordance with a method disclosed in Japanese laid-Open Patent Publication No. 1-299874. Namely, the wet cake (water paste) prepared in Example 1 was dried and 1 g of the dried material was included in 50 g of polyethylene glycol. The mixture was dispersed by a sand mill for 1 hr with 100 g of glass beads. After the crystal conversion, the dispersed material was washed with a diluted sulfuric acid and a aqueous solution of ammonium hydroxide in this order and dried to prepare a pigment. This is a Pigment 7.

Comparative Example 5

A pigment was prepared in accordance with a method disclosed in Japanese laid-Open Patent Publication No. 3-269064. Namely, the wet cake prepared in Example 1 was dried, and after 1 g of the dried material was stirred in a mixed solvent of 10 g of ion exchange water and 1 g of monochlorobenzene for 1 hr at 50° C., the mixture was washed with methanol and ion exchange water and dried to prepare a pigment. This is a Pigment 8.

Comparative Example 6

A pigment was prepared in accordance with a method disclosed in Japanese laid-Open Patent Publication No. 2-8256. Namely, 9.8 g of phthalodinitrile and 75 ml of 1-chloronaphthalene were mixed and stirred, and a 2.2 ml of titanium tetrachloride was dropped in the mixture under a nitrogen gas stream. The mixture was gradually heated to have a temperature of 200° C. and stirred for 3 hrs while the reaction temperature was maintained at 200 to 220° C. Then, the mixture was cooled to have a temperature of 130° C. and filtered to prepare a powder. After the powder was washed to have a blue color with 1-chloronaphthalene, methanol for several times and hot water having a temperature of 80° C. for several times, the powder was dried to prepare a pigment. This is a Pigment 9.

Comparative Example 7

A pigment was prepared in accordance with a method disclosed in Japanese laid-Open Patent Publication No. 64-17066. Namely, 5 parts of α-type TiOPc was subjected to a crystal conversion treatment by a sand grinder with 10 g of salt and 5 g of acetophenone at 100° C. for 10 hrs. The mixture was washed with ion exchange water and methanol and refined with an aqueous solution of a diluted sulfuric acid. Then, the mixture was washed with ion exchange water again not to have a acid content, and dried to prepare a pigment. This is a Pigment 10.

Comparative Example 8

A pigment was prepared in accordance with a method disclosed in Japanese laid-Open Patent Publication No. 11-5919. Namely, after 20.4 parts of o-phthalodinitrile and 7.6 parts of titanium tetrachloride were heated in 50 parts of quinoline at 200° C. for 2 hrs, the solvent was removed from the mixture by a steam distillation. The mixture was refined with a chloride aqueous solution having a concentration of 2% and a sodium hydroxide aqueous solution having a concentration of 2%. Then, the mixture was washed with methanol and N,N-dimethylformamide, and dried to prepare 21.3 parts of titanylphthalocyanine. 2 parts of the titanylphthalocyanine was gradually dissolved in 40 parts of sulfuric acid having a concentration of 98% and a temperature of 5° C., and the mixture was stirred for about 1 hr while the temperature of 5° C. was maintained. Then, the mixture was slowly included in 400 parts of iced water in which a sulfuric acid was mixed and stirred at a high speed, and a precipitated crystal was filtered. The crystal was washed with distilled water not to have an acid content to prepare a wet cake. The wet cake including a supposed content of 2 parts of phthalocyanine was stirred in 100 parts of tetrahydrofuran for about 5 hrs. The mixture was filtered, washed and dried to prepare a pigment. This is a Pigment 11.

X-ray diffraction spectra of the pigments prepared in Comparative Examples 4 to 8 were measured by the same method used for the pigments prepared in Examples 1 to 3 and Comparative Examples 1 to 3 to find that the spectra were the same spectra disclose in respective Publications. Table 2 which is similar to Table 1 shows evaluation results of the pigments prepared in Comparative Examples 4 to 8.

TABLE 2

| | Average Particle Size (μm) | Remarks | Crystal Form |
|---|---|---|---|
| Comparative Example 4 | 0.18 | The particle sizes were almost uniform. | The crystal form was different from that of Example 1, not having a peak at 9.4° and 9.6°. |

TABLE 2-continued

| | Average Particle Size (μm) | Remarks | Crystal Form |
|---|---|---|---|
| Comparative Example 5 | 0.23 | The particle sizes included large sizes of from about 0.3 to 0.4 μm. | The crystal form was different from that of Example 1, not having a peak at 7.3°. |
| Comparative Example 6 | 0.36 | The particle sizes included huge sizes not less than 0.5 μm. | The crystal form was different from that of Example 1, not having an apparent peak at 9.4° and 9.6°. |
| Comparative Example 7 | 0.20 | The particle sizes were almost uniform. | The crystal form was different from that of Example 1, having a peak at 7.5°. |
| Comparative Example 8 | 0.56 | The particle sizes included huge sizes not less than 0.5 μm. | The crystal form was different from that of Example 1, having a peak at 7.5° and an overlapped peak at 9.4° and 9.6°. |

Example 4

The following components were dispersed with a commercial beads mill disperser using a PSZ ball having a diameter of 0.5 mm at a rotor revolution speed at 1,500 rpm and the dispersion was stopped when the volume-average particle diameter was less than 0.2 μm to prepare a dispersion liquid. This is a Dispersion Liquid 1.

| | |
|---|---|
| Titanylphthalocyanine crystal prepared in Example 1 (Pigment 1) | 15 |
| Polyvinylbutyral (BX-1 from Sekisui Chemical Co., Ltd.) | 10 |
| 2-butanone | 280 |

Dispersion Liquid 1 contains 357 ppm tetrahydrofuran when dried.

Dispersion Liquid 1 was placed in a flask and subjected to reduced pressure (>10 mmHg) in an evaporator for 2 days at 80° C. to obtain Dried Material 1. Dried Material 1 was removed from the flask and crushed in a mortar to be microparticulated. The microparticulated sample of Dried Material 1 (about 0.5 mg) was examined by thermal extraction-gas chromatographic-mass spectrometric assay as described above with reference to Example 1. The peak area observed from the thermal extraction-gas chromatographic-mass spectrometric assay showed that Dried Material 1 contained 357 ppm tetrahydrofuran.

Example 5

The procedures of preparation for the dispersion liquid in Example 4 were repeated except for changing the titanylphthalocyanine crystal to Pigment 2 to prepare a dispersion liquid. This is a Dispersion Liquid 2. Dispersion Liquid 2 contains 564 ppm toluene when dried.

Dispersion Liquid 2 was placed in a flask and subjected to reduced pressure (>10 mmHg) in an evaporator for 2 days at 80° C. to obtain Dried Material 2. Dried Material 2 was removed from the flask and crushed in a mortar to be microparticulated. The microparticulated sample of Dried Material 2 (about 0.5 mg) was examined by thermal extraction-gas chromatographic-mass spectrometric assay as described above with reference to Example 1, except that the measured ion was toluene-discriminative (m/z=65.10 and 91.10). The peak area observed from the thermal extraction-gas chromatographic-mass spectrometric assay showed that Dried Material 2 contained 564 ppm toluene.

Example 6

The procedures of preparation for the dispersion liquid in Example 4 were repeated except for changing the titanylphthalocyanine crystal to Pigment 3 to prepare a dispersion liquid. This is a Dispersion Liquid 3. Dispersion Liquid 3 contains 544 ppm dichloromethane when dried.

Dispersion Liquid 3 was placed in a flask and subjected to reduced pressure (>10 mmHg) in an evaporator for 2 days at 80° C. to obtain Dried Material 3. Dried Material 3 was removed from the flask and crushed in a mortar to be microparticulated. The microparticulated sample of Dried Material 3 (about 0.5 mg) was examined by thermal extraction-gas chromatographic-mass spectrometric assay as described above with reference to Example 1, except that the measured ion was dichloromethane-discriminative (m/z=49.05, 84.00, and 86.00). The peak area observed from the thermal extraction-gas chromatographic-mass spectrometric assay showed that Dried Material 3 contained 544 ppm dichloromethane.

Example 7

The procedures of preparation for the dispersion liquid in Example 4 were repeated except for changing the titanylphthalocyanine crystal to Pigment 4 to prepare a dispersion liquid. This is a Dispersion Liquid 4.

Comparative Example 9

The procedures of preparation for the dispersion liquid in Example 4 were repeated except for changing the titanylphthalocyanine crystal to Pigment 5 to prepare a dispersion liquid. This is a Dispersion Liquid 5.

Comparative Example 10

The procedures of preparation for the dispersion liquid in Example 4 were repeated except for changing the titanylphthalocyanine crystal to Pigment 6 to prepare a dispersion liquid. This is a Dispersion Liquid 6.

Comparative Example 11

The procedures of preparation for the dispersion liquid in Example 4 were repeated except for changing the titanylphthalocyanine crystal to Pigment 7 to prepare a dispersion liquid. This is a Dispersion Liquid 7.

Comparative Example 12

The procedures of preparation for the dispersion liquid in Example 4 were repeated except for changing the titanylphthalocyanine crystal to Pigment 8 to prepare a dispersion liquid. This is a Dispersion Liquid 8.

Comparative Example 13

The procedures of preparation for the dispersion liquid in Example 4 were repeated except for changing the titanylphthalocyanine crystal to Pigment 9 to prepare a dispersion liquid. This is a Dispersion Liquid 9.

Comparative Example 14

The procedures of preparation for the dispersion liquid in Example 4 were repeated except for changing the titanylphthalocyanine crystal to Pigment 10 to prepare a dispersion liquid. This is a Dispersion Liquid 10.

Comparative Example 15

The procedures of preparation for the dispersion liquid in Example 4 were repeated except for changing the titanylphthalocyanine crystal to Pigment 11 to prepare a dispersion liquid. This is a Dispersion Liquid 11.

Comparative Example 16

The procedures of preparation for the dispersion liquid in Comparative Example 10 were repeated except for stopping the dispersion before the crystal form changes. This is a Dispersion Liquid 12.

Particle sizes (volume-average particle diameter) of the pigments in the dispersion liquids prepared in Examples 4 to 7 and Comparative Examples 9 to 16 were measured by CAPA700 from Horiba, Ltd. In addition, X-ray diffraction spectra of powders prepared by drying and hardening the dispersion liquids were measured. The results are shown in Table 3.

TABLE 3

Figure 11:
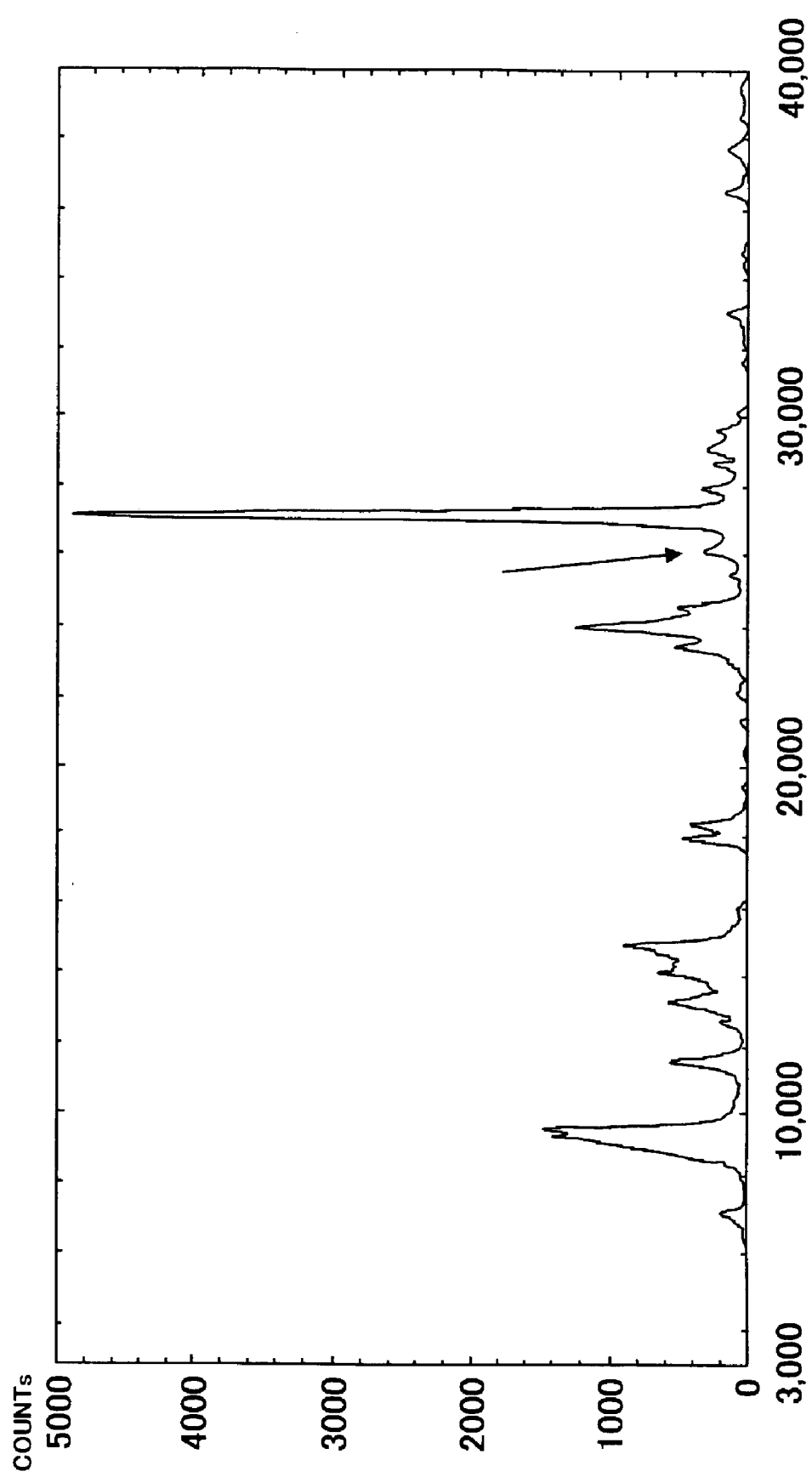
FIG. 11 is a diagram showing an X-ray spectrum of the titanylphthalocyanine crystal prepared in Comparative Example 9.

| | Volume-Average Particle Diameter (μm) | XD Diffraction Spectrum |
|---|---|---|
| Example 4 (Dispersion Liquid 1) | 0.18 | Same before dispersion. |
| Example 5 (Dispersion Liquid 2) | 0.19 | Same before dispersion. |
| Example 6 (Dispersion Liquid 3) | 0.18 | Same before dispersion. |
| Example 7 (Dispersion Liquid 4) | 0.18 | Same before dispersion. |
| Comparative Example 9 (Dispersion Liquid 5) | 0.19 | Changed to a spectrum shown in FIG. 11 |
| Comparative Example 10 (Dispersion Liquid 6) | 0.20 | Changed to a spectrum shown in FIG. 11 |
| Comparative Example 11 (Dispersion Liquid 7) | 0.19 | Same before dispersion. |
| Comparative Example 12 (Dispersion Liquid 8) | 0.18 | Changed to a spectrum shown in FIG. 11 |
| Comparative Example 13 (Dispersion Liquid 9) | 0.20 | Changed to a spectrum shown in FIG. 11 |
| Comparative Example 14 (Dispersion Liquid 10) | 0.19 | Same before dispersion. |
| Comparative Example 15 (Dispersion Liquid 11) | 0.20 | Changed to a spectrum shown in FIG. 11 |
| Comparative Example 16 (Dispersion Liquid 12) | 0.40 | Same before dispersion. |

A new peak indicated by an arrow in FIG. 11 appeared. A part of the crystal form changed to another crystal form.

Example 8

An undercoat layer coating liquid, a CGL coating liquid and CTL coating liquid having the following components were coated and dried in this order on an aluminium cylinder having a diameter of 60 mm (JIS1050) as a substrate to prepare a multilayer photoreceptor having an undercoat layer 3.5 μm thick, a CGL 0.2 μm thick and a CTL 25 μm thick.

Undercoat Layer Coating Liquid

| | |
|---|---|
| Titanium oxide (CR-EL from Ishihara Sangyo Kaisha, ltd.) | 70 |
| Alkyd resin (Bekkolite M6401-50-S (solid content 50%) from Dainippon Ink And Chemicals, inc.) | 15 |
| Melamine resin (Super Bekkamin L-121-60 (solid content 60%) from Dainippon Ink And Chemicals, inc.) | 10 |
| 2-butanone | 100 |

CGL Coating Liquid

The Dispersion Liquid 1 was used.

CTL Coating Liquid

| | |
|---|---|
| Polycarbonate (Iupilon Z300 from Mitsubishi Gas Chemical Co., Inc.) | 10 |
| CTM having the following formula | 7 |
| Methylene chloride | 80 |

Example 9

The procedures of preparation for the photoreceptor in Example 8 were repeated except for using the Dispersion Liquid 2 as a CGL coating liquid instead of the Dispersion Liquid 1 to prepare a photoreceptor.

Example 10

The procedures of preparation for the photoreceptor in Example 8 were repeated except for using the Dispersion Liquid 3 as a CGL coating liquid instead of the Dispersion Liquid 1 to prepare a photoreceptor.

Example 11

The procedures of preparation for the photoreceptor in Example 8 were repeated except for using the Dispersion Liquid 4 as a CGL coating liquid instead of the Dispersion Liquid 1 to prepare a photoreceptor.

Comparative Example 17

The procedures of preparation for the photoreceptor in Example 8 were repeated except for using the Dispersion Liquid 5 as a CGL coating liquid instead of the Dispersion Liquid 1 to prepare a photoreceptor.

Comparative Example 18

The procedures of preparation for the photoreceptor in Example 8 were repeated except for using the Dispersion Liquid 6 as a CGL coating liquid instead of the Dispersion Liquid 1 to prepare a photoreceptor.

Comparative Example 19

The procedures of preparation for the photoreceptor in Example 8 were repeated except for using the Dispersion Liquid 7 as a CGL coating liquid instead of the Dispersion Liquid 1 to prepare a photoreceptor.

Comparative Example 20

The procedures of preparation for the photoreceptor in Example 8 were repeated except for using the Dispersion Liquid 8 as a CGL coating liquid instead of the Dispersion Liquid 1 to prepare a photoreceptor.

Comparative Example 21

The procedures of preparation for the photoreceptor in Example 8 were repeated except for using the Dispersion Liquid 9 as a CGL coating liquid instead of the Dispersion Liquid 1 to prepare a photoreceptor.

Comparative Example 22

The procedures of preparation for the photoreceptor in Example 8 were repeated except for using the Dispersion Liquid 10 as a CGL coating liquid instead of the Dispersion Liquid 1 to prepare a photoreceptor.

Comparative Example 23

The procedures of preparation for the photoreceptor in Example 8 were repeated except for using the Dispersion Liquid 11 as a CGL coating liquid instead of the Dispersion Liquid 1 to prepare a photoreceptor.

Comparative Example 24

The procedures of preparation for the photoreceptor in Example 8 were repeated except for using the Dispersion Liquid 12 as a CGL coating liquid instead of the Dispersion Liquid 1 to prepare a photoreceptor.

The thus prepared electrophotographic photoreceptors in Examples 8 to 11 and comparative Examples 17 to 24 were installed in the electrophotographic apparatus in FIG. 3, which uses a LD having a wavelength of 780 nm as an imagewise light irradiator (with a polygon mirror) and a contact charging roller as a charger, and images were produced in the following charging conditions:

DC bias: approximately −1,600 V (an unexposed part potential of the photoreceptors was −900 V)

20,000 images of a chart having a written part of 6% were continuosly produced, and an initial image and an image after production of 20,000 images were evaluated. Specifically, a white mat image was produced in the initial stage and after 20,000 images were produced to evaluate background fouling thereof as shown in Table 4.

In addition, at the same time, a jig was used such that an electrometer was set at a position where the image developer was installed so as to measure surface potential of the photoreceptor (a solid image developed portion thereof). The results of the surface potential of the photoreceptor in the initial stage and after 20,000 images were produced are shown in Table 4.

TABLE 4

|  | Dispersion Liquid | Images | | Surface Potential (−V) | |
| --- | --- | --- | --- | --- | --- |
|  |  | Initial | After 20,000 images | Initial | After 20,000 images |
| Ex. 8 | 1 | 5 | 4 | 120 | 135 |
| Ex. 9 | 2 | 5 | 4 | 120 | 135 |
| Ex. 10 | 3 | 5 | 4 | 120 | 135 |
| Ex. 11 | 4 | 4 | 3 | 130 | 145 |
| Com. Ex. 17 | 5 | 4 | 3 | 140 | 180 |
| Com. Ex. 18 | 6 | 4 | 3 | 150 | 200 |
| Com. Ex. 19 | 7 | 4 | 2 | 130 | 160 |
| Com. Ex. 20 | 8 | 4 | 3 | 140 | 185 |
| Com. Ex. 21 | 9 | 4 | 2 | 150 | 195 |
| Com. Ex. 22 | 10 | 4 | 2 | 125 | 155 |
| Com. Ex. 23 | 11 | 4 | 2 | 135 | 170 |
| Com. Ex. 24 | 12 | 3 | 2 | 130 | 140 |

Background fouling level:
5: Almost no background fouling
4: Slight background fouling
3: Limit level for practical use
2 or less: Impossible level for practical use

Example 12

The procedures of preparation for the photoreceptor in Example 8 were repeated except for changing the CTL coating liquid to a CTL coating liquid having the following components to prepare a photoreceptor.

CTL Coating Liquid

| | |
|---|---|
| Polymer CTM having the following formula and approximate weight-average molecular weight of 140,000 | 10 |
| 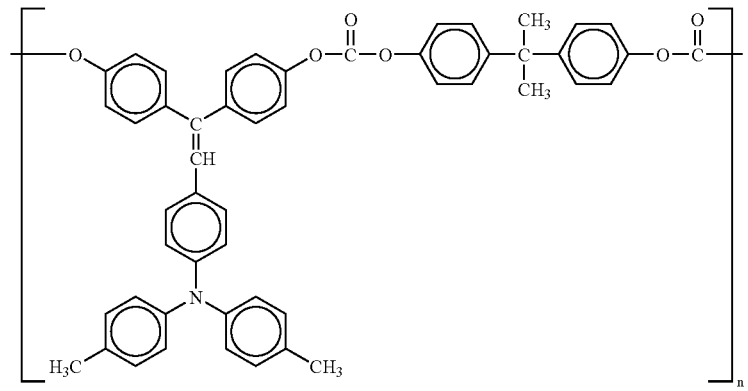 | |
| Additive having the following formula | 0.5 |
| 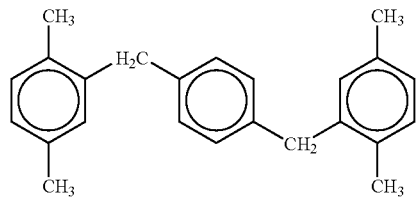 | |
| Methylene chloride | 100 |

Example 13

The procedures of preparation for the photoreceptor in Example 8 were repeated except that the thickness of the CTL was changed to 22 μm and a protection layer coating liquid having the following components was coated and dried on the CTL to form a protection layer having a thickness of 3 μm thereon.

Protection Layer Coating Liquid

| | |
|---|---|
| Polycarbonate (Iupilon Z300 from Mitsubishi Gas Chemical Co., Inc.) | 10 |
| CTM having the following formula | 7 |
| 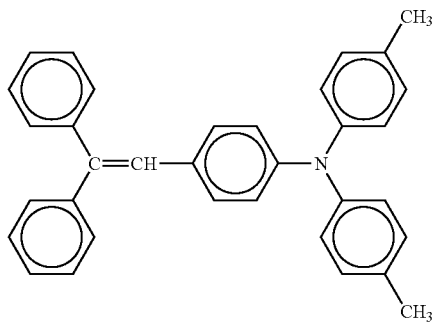 | |

-continued

| | |
|---|---|
| α-Alumina fine particles having a resistivity of $2.5 \times 10^{12}$ Ω·cm and an average primary particle diameter of 0.4 μm | 4 |
| Cyclohexanone | 500 |
| Tetrahydrofuran | 150 |

Example 14

The procedures of preparation for the photoreceptor in Example 8 were repeated except that the thickness of the CTL was changed to 22 μm and a protection layer coating liquid having the following components was coated and dried on the CTL to form a protection layer having a thickness of 3 μm thereon.

Protection Layer Coating Liquid

| | |
|---|---|
| Polycarbonate (Iupilon Z300 from Mitsubishi Gas Chemical Co., Inc.) | 10 |
| CTM having the following formula | 7 |

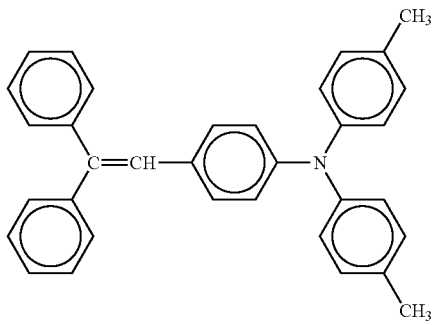

| Titanium oxide fine particles having a resistivity of $1.5 \times 10^{10}$ $\Omega \cdot$ cm and an average primary particle diameter of 0.5 μm | 4 |
|---|---|
| Cyclohexanone | 500 |
| Tetrahydrofuran | 150 |

Example 15

The procedures of preparation for the photoreceptor in Example 8 were repeated except that the thickness of the CTL was changed to 22 μm and a protection layer coating liquid having the following components was coated and dried on the CTL to form a protection layer having a thickness of 3 μm thereon.

Protection Layer Coating Liquid

| Polycarbonate (Iupilon Z300 from Mitsubishi Gas Chemical Co., Inc.) | 10 |
|---|---|
| CTM having the following formula | 7 |

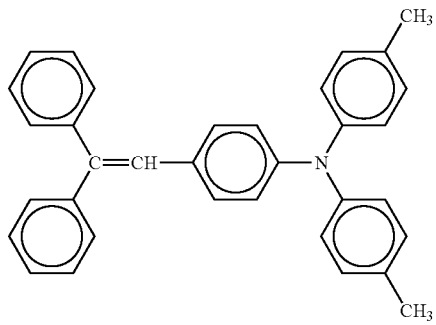

| Tin oxide-antimony oxide powder having a resistivity of $10^6$ $\Omega \cdot$ cm and an average primary particle diameter of 0.4 μm | 4 |
|---|---|
| Cyclohexanone | 500 |
| Tetrahydrofuran | 150 |

Example 16

The procedures of preparation for the photoreceptor in Example 8 were repeated except that the thickness of the CTL was changed to 22 μm and a protection layer coating liquid having the following components was coated and dried on the CTL to form a protection layer having a thickness of 3 μm thereon.

Protection Layer Coating Liquid

| Polymer CTM having the following formula and approximate weight-average molecular weight of 140,000 | 17 |
|---|---|

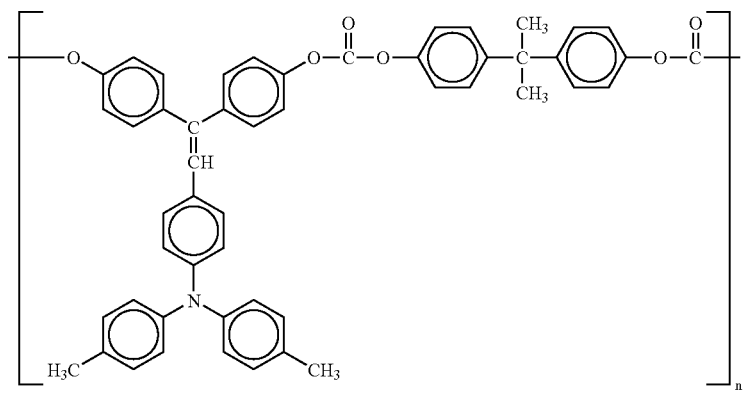

| Alumina fine particles having a resistivity of $2.5 \times 10^{12}$ $\Omega \cdot$ cm and an average primary particle diameter of 0.4 μm | 4 |
|---|---|
| Cyclohexanone | 500 |
| Tetrahydrofuran | 150 |

The thus prepared electrophotographic photoreceptors in Examples 8 and 12 to 16 were installed in the electrophotographic apparatus in FIG. 3, which uses a LD having a wavelength of 780 nm as an imagewise light irradiator (with a polygon mirror) and a contact charging roller as a charger, and images were produced in the following charging conditions:

DC bias: approximately −1,600 V (an unexposed part potential of the photoreceptors was −900 V)

50,000 images of a chart having a written part of 6% were continuosly produced, and an initial image and an image after production of 50,000 images were evaluated. Specifically, a white mat image was produced in the initial stage and after 20,000 images were produced to evaluate background fouling thereof as shown in Table 5.

In addition, after 50,000 images were produced, 50 images were produced in an environment of a temperature at 30° C. and a humidity at 90% RH.

Further, surface abrasion amounts of the photoreceptors were measured after 50,000 images were produced.

The results are shown in Table 5.

TABLE 5

|  | Background Fouling | | Image | | Abrasion |
|---|---|---|---|---|---|
|  | Initial | After 50,000 | After 50,000 | 30° C./90% RH | Amount (μm) |
| Ex. 8 | 5 | 3 | Image density slightly lowered | Image density slightly lowered | 3.1 |
| Ex. 12 | 5 | 3 to 4 | Good | Good | 1.5 |
| Ex. 13 | 5 | 4 to 5 | Good | Good | 0.6 |
| Ex. 14 | 5 | 4 to 5 | Good | Good | 0.6 |
| Ex. 15 | 5 | 4 | Slightly blurred | Blurred | 0.7 |
| Ex. 16 | 5 | 5 | Good | Good | 0.4 |

Background fouling level:
5: Almost no background fouling
4: Slight background fouling
3: Limit level for practical use
2 or less: Impossible level for practical use Example 17

The photoreceptor prepared in Example 8 was installed in the electrophotographic apparatus in FIG. 3, which uses a LD having a wavelength of 780 nm as an imagewise light irradiator (with a polygon mirror) and a charger located closely to the photoreceptor in FIG. 4 (a gap therebetween was 50 μm), which was a charging roller having a wound insulative tape 50 μm thick at both ends thereof. Images were produced in the following charging conditions:

DC bias: approximately −1,650 V (an unexposed part potential of the photoreceptors was −900 V)

20,000 images of a chart having a written part of 6% were continuosly produced, and an initial image and an image after production of 20,000 images were evaluated. After 20,000 images were produced, a halftone image was produced to evaluate.

Example 18

The procedures of evaluation for the photoreceptor in Example 17 were repeated except for changing the charging conditions as follows:

DC bias: −900 V
AC bias: 2.0 kV (peak to peak)
Frequency: 1.5 kHz

Example 19

The procedures of evaluation for the photoreceptor in Example 18 were repeated except for changing the thickness of the insulative tape and the gap from 50 to 150 μm.

Example 20

The procedures of evaluation for the photoreceptor in Example 18 were repeated except for changing the thickness of the insulative tape and the gap from 50 to 250 μm.

The results are shown in Table 6 including those of Example 8.

TABLE 6

|  | Halftone Image | Remarks |
|---|---|---|
| Example 8 | Slightly nonuniform | Charging roller is observably contaminated |
| Example 17 | Slightly nonuniform | No charging roller contamination |
| Example 18 | No nonuniform | No charging roller contamination |
| Example 19 | No nonuniform | No charging roller contamination |
| Example 20 | Slightly nonuniform | No charging roller contamination |

Example 21

The procedures of preparation for the photoreceptor in Example 8 were repeated to prepare a photoreceptor except for changing the substrate to an aluminium cylinder having a diameter of 30 mm (JIS1050).

Example 22

The procedures of preparation for the photoreceptor in Example 21 were repeated to prepare a photoreceptor except that the aluminium cylinder was subjected to the following anodic oxide coating without forming the undercoat layer.

Anodic Oxide Coating

A surface of the cylinder was abraded to have a mirror finished surface, and degreasing cleaning and water washing were performed on the cylinder. Then, the cylinder was dipped in an electrolyte including a sulfuric acid of 15% by volume and having a temperature of 20° C. to perform an anodic oxide coating at a bath voltage of 15 V for 30 min. Further, the cylinder was washed with water and sealed with an aqueous solution of nickel acetate (50° C.) having a concentration of 7%. Then, the cylinder was washed with purified water to prepare a substrate having an anodic oxide coated layer having a thickness of 6 μm.

Comparative Example 25

The procedures of preparation for the photoreceptor in Comparative Example 17 were repeated to prepare a photoreceptor except for changing the substrate to an aluminium cylinder having a diameter of 30 mm (JIS1050).

Comparative Example 26

The procedures of preparation for the photoreceptor in Comparative Example 24 were repeated to prepare a photoreceptor except for changing the substrate to an aluminium cylinder having a diameter of 30 mm (JIS1050).

The thus prepared photoreceptors in Examples 21, and 22 and Comparative Examples 25 and 26 were installed in the cartridge for an electrophotographic apparatus in FIG. 6, and the cartridge was installed in the electrophotographic apparatus in FIG. 7, which uses a LD having a wavelength of 780 nm as an imagewise light irradiator (with a polygon mirror) and a charger located closely to the photoreceptor in FIG. 4 (a gap therebetween was 50 μm), which was a charging roller having a wound insulative tape 50 μm thick at both ends thereof. Images were produced in the following charging conditions:

DC bias: approximately −800 V
AC bias: 1.8 kV (peak to peak)
Frequency: 1.5 kHz 20,000 images of a full-color chart having a written part of 6% were continuosly produced, and an initial image and an image after production of 20,000 images were evaluated. Specifically, a white mat image was produced in the initial stage and after 20,000 images were produced to evaluate background fouling thereof. In addition, a chart for color reproducibility evaluation was used to evaluate color reproducibility of an image after 20,000 images were produced. The results are shown in Table 7.

TABLE 7

|  | Background Fouling | | Color Reproducibility |
| --- | --- | --- | --- |
|  | Initial | After 20,000 |  |
| Ex. 21 | 5 | 3 to 4 | Good |
| Ex. 22 | 5 | 4 to 5 | Good |
| Com. Ex. 23 | 5 | 3 | Color balance was lost |
| Com. Ex. 24 | 4 | 2 | Good |

Background fouling level:
5: Almost no background fouling
4: Slight background fouling
3: Limit level for practical use
2 or less: Impossible level for practical use Finally, whether the minimum diffraction peak at a lowest Bragg (2θ) angle of 7.3° of the titanylphthalocyanine crystal of the present invention is different from peaks at 7.5° of known materials will be verified.

Measurement Example 1

Three % by weight of a pigment prepared by a method disclosed in Japanese Laid-Open Patent Publication No. 61-239248 (having a maximum diffraction peak at 7.5°) was included in the pigment prepared in Example 1 (having a minimum diffraction peak at 7.3°). The mixture was mixed in a mortar and an X-ray spectrum thereof was measured. The results are shown in FIG. 12.

Measurement Example 2

Figure 13:
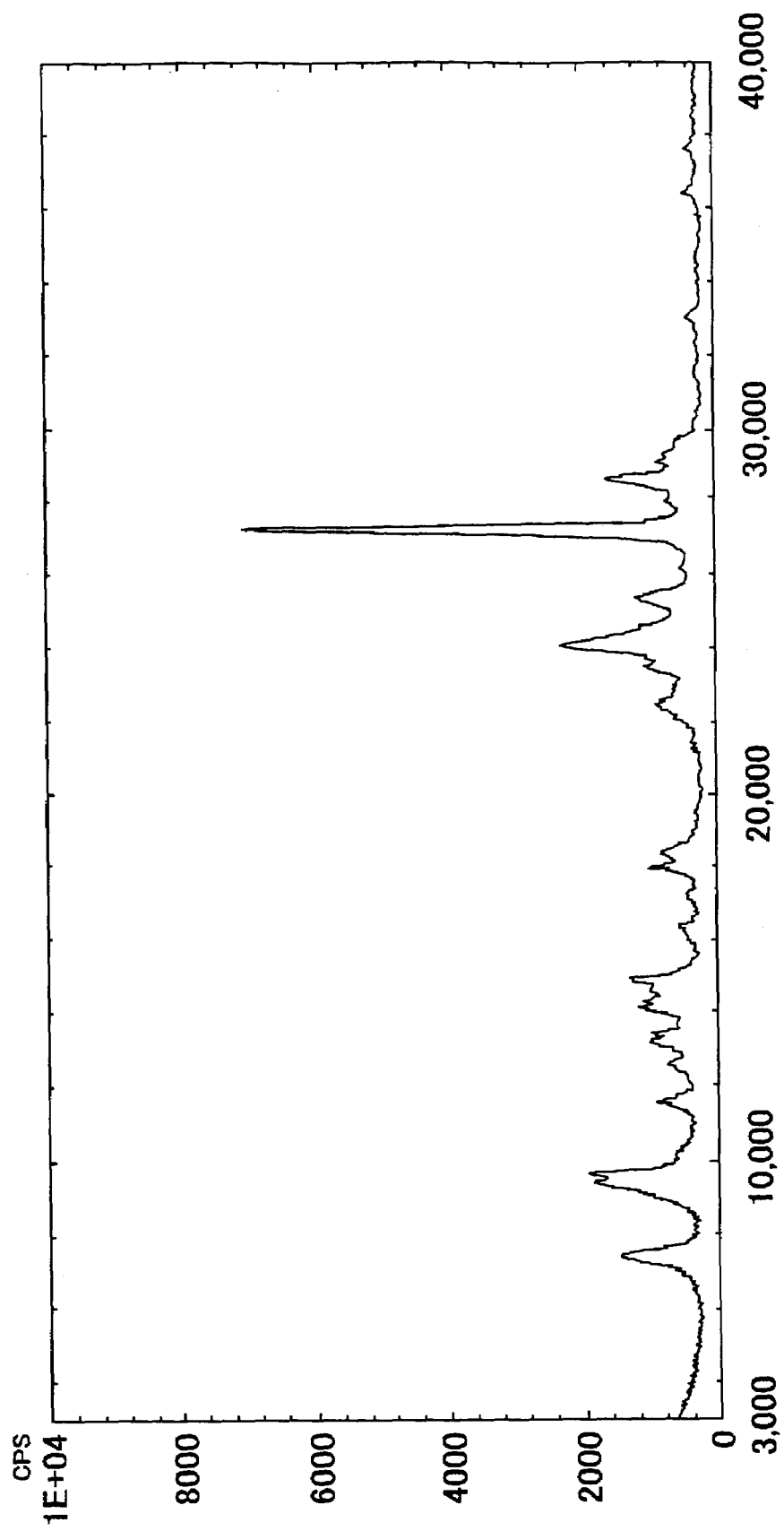
FIG. 13 is a diagram showing an X-ray spectrum of the titanylphthalocyanine crystal prepared in Measurement Example 2.

Three % by weight of a pigment prepared by a method disclosed in Japanese Laid-Open Patent Publication No. 61-239248 (having a maximum diffraction peak at 7.5°) was included in the pigment prepared in Comparative Example 1 (having a minimum diffraction peak at 7.5°). The mixture was mixed in a mortar and an X-ray spectrum thereof was measured. The results are shown in FIG. 13.

Figure 12:
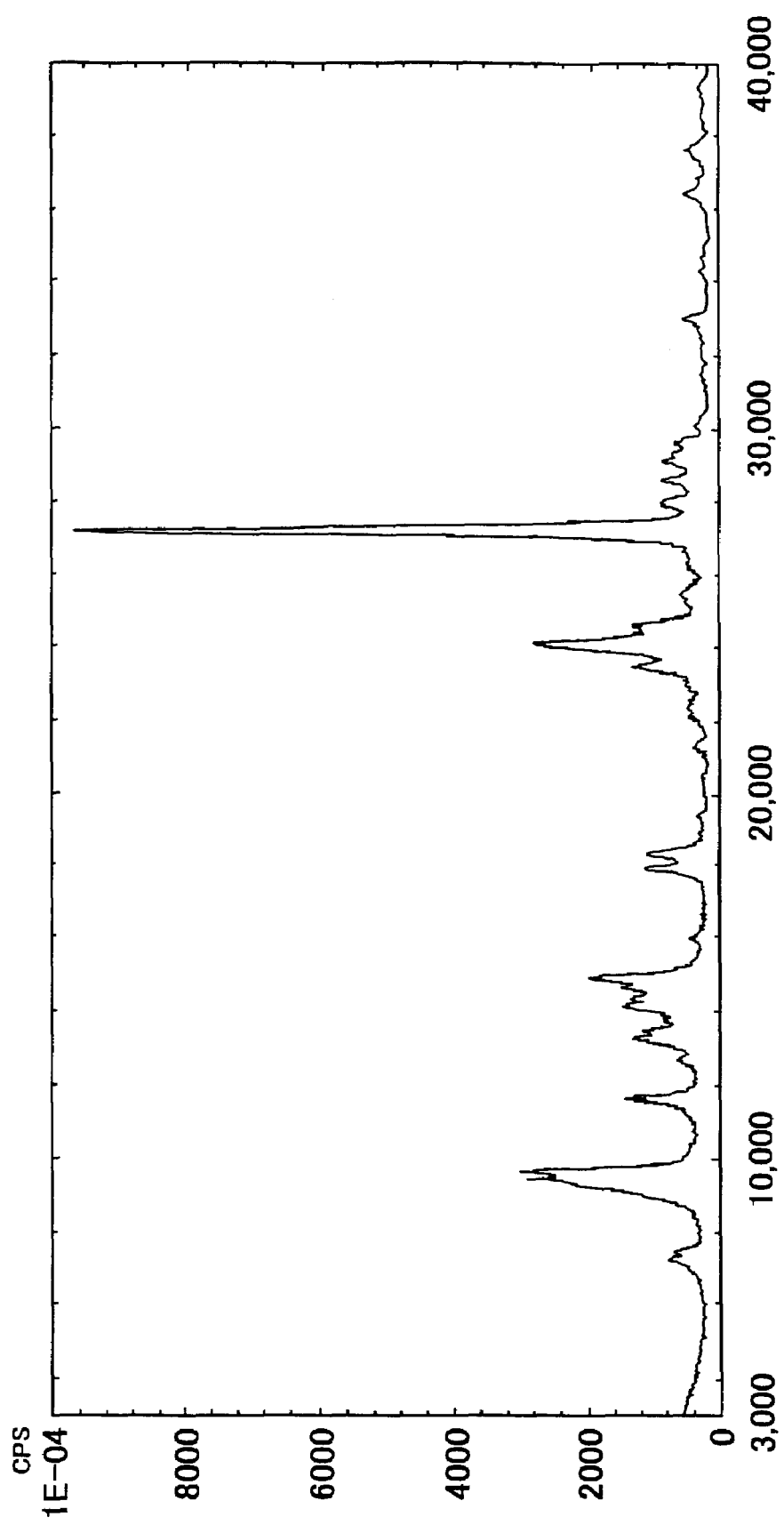
FIG. 12 is a diagram showing an X-ray spectrum of the titanylphthalocyanine crystal prepared in Measurement Example 1.

The spectrum in FIG. 12 has two independent peaks at low angles of 7.3 and 7.5°, and they are different from each other. The spectrum in FIG. 13 has only one peak at a low angle of 7.5°, and is apparently different from the spectrum in FIG. 12.

Consequently, the minimum diffraction peak at a lowest Bragg (2θ) angle of 7.3° of the titanylphthalocyanine crystal of the present invention is different from peaks at 7.5° of known titanylphthalocyanine crystals.

In this application several X-ray features of preferred materials are described. For example, the phrase "preferably no diffraction peak is observed at an angle greater than 7.3° and less than 9.4°" is used throughout to describe preferred spectrum characteristics. It should be noted, however, that all spectrum peaks have a certain variation in peak assignment that typically depends upon the accuracy and repeatability of the instrument. In many cases, variation is as little as 0.02 degrees, or less. Thus, where peaks positions are specified herein they may have a position variation of plus or minus 0.2 degrees, more preferably plus or minus 0.1 degrees, including all of 0.05, 0.02, etc. degrees. Thus, in practicality the phrase "no diffraction peak is observed at an angle greater than 7.3° and less than 9.4°" is meant to set a minimum interval between the required peaks at 7.3 and 9.4 of 2.0 degrees absolute or more where no peak is present.

This document claims priority and contains subject matter related to Japanese Patent Application No. 2002-172496 filed on Jun. 13, 2002, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A crystalline pigment, comprising:
   titanylphthalocyanine;
   a binder resin; and
   dicholoromethane;
   wherein said crystalline pigment has a CuKα 1.542 Å X-ray diffraction spectrum comprising plural diffraction peaks and a primary particle diameter not greater than 0.2 μm,
   wherein a maximum diffraction peak is observed at a Bragg (2θ) angle of 27.2°; main peaks are observed at 94°, 9.6° and 24.0°; and a minimum diffraction peak is observed at 73°; and no diffraction peak is observed at an angle greater than 73° and less than 94°,
   wherein said angles may vary by ±0.2° and the minimum interval where no peak is observed between required peaks at 7.3 and 9.4 is 2.0 degrees absolute or more, and wherein no diffraction peak is observed at 26.3°.

2. An electrophotographic photoreceptor comprising:
   an electroconductive substrate;
   a charge generation layer located overlying the electroconductive substrate and comprising the titanylphthalocyanine crystalline pigment according to claim 1; and
   a charge transport layer located overlying the charge generation layer.

3. The electrophotographic photoreceptor of claim 2, wherein the charge transport layer comprises a charge transport polymer material.

4. The electrophotographic photoreceptor of claim 2, further comprising a protection layer located overlying the charge transport layer.

5. The electrophotographic photoreceptor of claim 3, wherein the protection layer comprises at least one of an inorganic pigment and a metal oxide, which have a resistivity not less than $10^{10}$ Ω·cm.

6. The electrophotographic photoreceptor of claim 5, comprising a metal oxide selected from the group consisting of alumina, titanium oxide and silica.

7. The electrophotographic photoreceptor of claim 4, wherein the protection layer comprises a charge transport polymer material.

8. The electrophotographic photoreceptor of claim 2, wherein an oxide film is formed on the substrate by anodizing.

9. An image forming method comprising;
   charging the electrophoto graphic photoreceptor according to claim 2;

irradiating the electrophotographic photoreceptor with imagewise light to form an electrostatic latent image thereon;

developing the electrostatic latent image with a developer comprising a toner to form a toner image thereon; and transferring the toner image onto a transfer sheet.

10. An image forming apparatus comprising;

at least one image forming unit comprising;

the electrophoto graphic photoreceptor according to claim 2;

a charger configured to charge the electrophotographic photoreceptor;

an irradiator configured to irradiate the electrophotographic photoreceptor with imagewise light to form an electrostatic latent image thereon;

an image developer configured to develop the electrostatic latent image with a developer comprising a toner to form a toner image thereon; and a transferer configured to transfer the toner image onto a transfer sheet.

11. The image forming apparatus of claim 10, comprising plural image forming units.

12. The image forming apparatus of claim 10, wherein the charger is contacted or located close to the electrophotographic photoreceptor.

13. The image forming apparatus of claim 12, wherein the charger is located close to the electrophotographic photoreceptor and a gap between the charger and the electrophotographic photoreceptor is not greater than 200 μm.

14. The image forming apparatus of claim 10, wherein the charger applies a DC voltage overlapped with an AC voltage to the electrophotographic photoreceptor.

15. A process cartridge for an image forming apparatus, comprising;

the electrophotographic photoreceptor according to claim 2; and at least one of:

a charger configured to charge the electrophotographic photoreceptor;

an irradiator configured to irradiate the electrophotographic photoreceptor with imagewise light to form an electrostatic latent image thereon;

an image developer configured to develop the electrostatic latent image with a developer comprising a toner to form a toner image thereon;

a transferer configured to transfer the toner image onto a transfer sheet;

a cleaner configured to clean the photoreceptor after the toner image is transferred into the transfer sheet; and a discharger configured to discharge charges remaining on the photoreceptor after the toner image is transferred into the transfer sheet.

16. The crystalline pigment of claim 1, further comprising tetrahydrofuran.

17. The crystalline pigment of claim 1, further comprising toluene.

18. The crystalline pigment of claim 1, wherein the pigment comprises substantially needle-shaped particles.

* * * * *

UNITED STATES PATENT AND TRADEMARK OFFICE
CERTIFICATE OF CORRECTION

PATENT NO. : 7,419,751 B2
APPLICATION NO. : 10/454556
DATED : September 2, 2008
INVENTOR(S) : Tatsuya Niimi Page 1 of 1

It is certified that error appears in the above-identified patent and that said Letters Patent is hereby corrected as shown below:

Column 42, lines 32-34,
"94°, 9.6° and 24.0°; and a minimum diffraction peak is observed at 73°; and no diffraction peak is observed at an angle greater than 73° and less than 94°,"

should read -- 9.4°, 9.6° and 24.0°; and a minimum diffraction peak is observed at 7.3°; and no diffraction peak is observed at an angle greater than 7.3° and less than 9.4°, --.

Signed and Sealed this

Second Day of June, 2009

JOHN DOLL
*Acting Director of the United States Patent and Trademark Office*